US012576471B2

(12) United States Patent
Okochi

(10) Patent No.: US 12,576,471 B2
(45) Date of Patent: Mar. 17, 2026

(54) BELT SANDER

(71) Applicant: MAKITA CORPORATION, Anjo (JP)

(72) Inventor: Katsumi Okochi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 475 days.

(21) Appl. No.: 18/170,839

(22) Filed: Feb. 17, 2023

(65) Prior Publication Data

US 2023/0302602 A1 Sep. 28, 2023

(30) Foreign Application Priority Data

Mar. 23, 2022 (JP) ................................ 2022-046452

(51) Int. Cl.
*B24B 23/06* (2006.01)
*B25F 5/02* (2006.01)

(52) U.S. Cl.
CPC ................ *B24B 23/06* (2013.01); *B25F 5/02* (2013.01)

(58) Field of Classification Search
CPC ....... B24B 23/06; B24B 21/004; B24B 21/04; B24B 21/20; B24B 47/12; B25F 5/02
USPC ................................ 451/355, 296, 344, 451
See application file for complete search history.

(56) References Cited

U.S. PATENT DOCUMENTS

| | | | |
|---|---|---|---|
| 5,199,501 A | 4/1993 | Kluber et al. | |
| 5,467,835 A | 11/1995 | Obermeier et al. | |
| 6,159,085 A | 12/2000 | Hara | |
| 10,766,116 B2 * | 9/2020 | Kellogg | B24B 21/20 |
| 2003/0032381 A1 | 2/2003 | Dutterer et al. | |
| 2005/0044051 A1 | 2/2005 | Selby et al. | |
| 2005/0252179 A1 | 11/2005 | Oh et al. | |
| 2015/0328764 A1 | 11/2015 | Yoshikane et al. | |
| 2021/0252665 A1 | 8/2021 | Petsri et al. | |

FOREIGN PATENT DOCUMENTS

| | | |
|---|---|---|
| CN | 105559702 B | 10/2017 |
| DE | 10238757 A1 | 3/2004 |
| JP | H11-114824 A | 4/1999 |

(Continued)

OTHER PUBLICATIONS

Machine translation of WO-2014119127-A1 (Year: 2014).*

(Continued)

*Primary Examiner* — Robert F Neibaur
(74) *Attorney, Agent, or Firm* — OLIFF PLC

(57) ABSTRACT

A belt sander has an electric motor, a housing including a motor housing part, belt driving part, first handle and battery mounting part. Where a direction in which a rotational axis of the drive roller and the driven roller extend is a left-right direction, a direction wherein the rollers are arranged in parallel is a front-rear direction, and a direction orthogonal to the left-right and front-rear directions is an up-down direction, the belt driving part is below the motor, and a polishing surface is defined by a lower surface of the sanding belt. The battery mounting part is configured so a battery can be mounted and removed by being slid in a sliding direction. The mounting part overlaps with the polishing surface viewed from above and overlaps with the motor viewed from the front. The sliding direction of the battery is a horizontal direction including the front-rear and left-right directions.

14 Claims, 26 Drawing Sheets

(56) References Cited

FOREIGN PATENT DOCUMENTS

| | | | | | |
|---|---|---|---|---|---|
| JP | H11-291170 | A | | 10/1999 | |
| JP | 2000-280157 | A | | 10/2000 | |
| JP | 2003-053654 | A | | 2/2003 | |
| JP | 2005-324002 | A | | 11/2005 | |
| JP | 2007-098498 | A | | 4/2007 | |
| JP | 2014-148014 | A | | 8/2014 | |
| JP | 2014-148018 | A | | 8/2014 | |
| JP | 2014166745 | A | * | 9/2014 | ............... B27B 9/02 |
| JP | 2020-001131 | A | | 1/2020 | |
| WO | 2009/038453 | A1 | | 3/2009 | |
| WO | WO-2014119127 | A1 | * | 8/2014 | ............. B24B 23/06 |

OTHER PUBLICATIONS

Machine translation of JP-2014166745-A (Year: 2014).*
U.S. Appl. No. 18/170,814, filed Feb. 17, 2023 on behalf of Katsumi Okochi.
Aug. 19, 2025 Office Action Issued in U.S. Appl. No. 18/170,814.
Aug. 19, 2025 Office Action issued in Japanese Patent Application No. 2022-046452.
Sep. 2, 2025 Office Action issued in Japanese Patent Application No. 2022-046450.

* cited by examiner

BELT SANDER

CROSS REFERENCE TO RELATED ART

The present application claims priority to Japanese Patent Application No. 2022-46452 filed on Mar. 23, 2022, the disclosure of which is hereby incorporated by reference in its entirety.

TECHNICAL FIELD

The present disclosure relates to a belt sander.

BACKGROUND

A belt sander for polishing a workpiece by rotating an endless sanding belt by a motor powered by a battery is well known. Japanese Unexamined Patent Application Publication No. 2014-148018 (patent document 1) discloses a belt sander that has a housing for housing the motor, a sanding belt provided directly below the housing, and a battery mounting part provided on the housing.

SUMMARY

The belt sander described in patent document 1 may become large in size in a certain direction depending on the position of the battery mounting part when the battery is mounted thereto, which may adversely affect the maneuverability in use. It is therefore desired to provide a technique for improving the operational efficiency of a belt sander driven by a battery.

According to a first aspect of the present disclosure, a belt sander is provided. The belt sander has an electric motor, a housing, a belt driving part, a first handle configured to be held by a user, and a battery mounting part. The belt driving part includes a drive roller configured to be rotated by the motor, and a driven roller. The belt driving part is configured to drive an endless sanding belt looped over the drive roller and the driven roller. Where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt. The first handle is provided on one side or rear side of the motor in the front-rear direction and extends in the front-rear direction. The battery mounting part is configured such that a battery as a power source of the motor can be mounted thereto and removed therefrom by being slid in a sliding direction. The battery mounting part is arranged in a position to overlap with the polishing surface when viewed from above and to overlap with the motor when viewed from the front. The sliding direction is a horizontal direction including the front-rear direction and the left-right direction.

In this specification, the horizontal direction refers to a direction parallel to an imaginary plane including the rotational axis of the drive roller and the rotational axis of the driven roller.

According to this aspect, the motor and the battery mounting part are provided above the belt driving part. Therefore, the weights of the motor and the battery mounted to the battery mounting part are applied to the polishing surface (sanding surface, working surface) during driving of the belt sander. Thus, a working operation can be performed by utilizing the masses of the motor and the battery, so that the operational efficiency is improved.

Overlapping of the battery mounting part with the polishing surface when viewed from above means that at least part of the battery mounting part is located in a position to overlap with the polishing surface in the front-rear direction and the left-right direction. Further, overlapping of the battery mounting part with the motor when viewed from the front means that at least part of the battery mounting part is located in a position to overlap with the motor in the up-down direction and the left-right direction.

According to a second aspect of the present disclosure, a belt sander is provided. The belt sander has an electric motor, a housing, a belt driving part, a first handle, a second handle that is turnable relative to the housing, and a battery mounting part. The housing includes a motor housing part for housing the motor. The belt driving part includes a drive roller configured to be rotated by the motor, and a driven roller. The belt driving part is configured to drive an endless sanding belt looped over the drive roller and the driven roller. Where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt. The first handle is provided on one side or rear side of the motor in the front-rear direction. The first handle extends in the front-rear direction and is configured to be held by a user. The second handle has an arm having a pivot axis extending in the left-right direction and connected to the housing, and a grip part connected to the aim and configured to be held by a user. The battery mounting part is configured such that a battery as a power source of the motor can be mounted thereto and removed therefrom by being slid in a sliding direction. The battery mounting part is arranged in a position to overlap with the polishing surface when viewed from above and to overlap with the motor when viewed from the front. The battery mounting part is configured such that the battery mounted to the battery mounting part does not protrude from an upper wall of the motor housing part in the up-down direction. The grip part is configured to move to a first turning position and a second turning position according to turning (turning operation) of the second handle. In the first turning position, an upper end of the grip part is located substantially in the same position as the upper wall in the up-down direction, and in the second turning position, the grip part is located below or above the battery.

According to this aspect, a working operation can be performed by utilizing the masses of the motor and the battery, so that the operational efficiency is improved. Further, the battery mounted to the battery mounting part does not protrude upward from the upper wall of the housing in the up-down direction, so that the belt sander with the battery mounted thereto can be more compact in the up-down direction. A user can use the belt sander in a normal mode (hereinafter referred to as a first use mode) in which the sanding belt is placed on a workpiece and the user performs a working operation while holding the first handle, and a mode (hereinafter referred to as a second use mode) in which the belt sander is set upside down, for example, on a desk, with the sanding belt facing vertically upward, and the user performs a working operation by pressing a workpiece onto the sanding belt while holding the workpiece. According to this aspect, in the second use mode, the upper wall of the housing and the second handle are placed in contact with a desk or the like, so that the attitude of the belt sander in the second use mode is stabilized.

According to a third aspect of the present disclosure, a belt sander is provided. The belt sander has an electric motor, a housing, a belt driving part, a first handle and a battery mounting part. The housing includes a motor housing part for housing the motor. The belt driving part includes a drive roller configured to be rotated by the motor, and a driven roller, and is configured to drive an endless sanding belt looped over the drive roller and the driven roller. Where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt. The first handle is provided on one side or rear side of the motor in the front-rear direction. The first handle extends in the front-rear direction and is configured to be held by a user. The battery mounting part is configured such that a battery as a power source of the motor can be mounted thereto and removed therefrom by being slid in a sliding direction. The battery mounting part is arranged on an upper wall of the motor housing part to overlap with the motor and the polishing surface when viewed from above. The battery mounting part is configured such that the battery can be mounted thereto by being slid in a direction from the rear to the front relative to the battery mounting part.

According to this aspect, a working operation can be performed by utilizing the masses of the motor and the battery, so that the operational efficiency is improved. Further, the battery is mounted in a direction from the front to the rear, so that the user can easily apply a force in a direction (from the rear to the front) opposite to the mounting direction of the battery with the hand holding the first handle. Therefore, the belt sander provides the advantage that the battery can be easily mounted to the battery mounting part.

According to a fourth aspect of the present disclosure, a belt sander to which the battery is removably mounted is provided.

According to this aspect, a working operation can be performed by utilizing the masses of the motor and the battery, so that the operational efficiency is improved.

DETAILED DESCRIPTION OF THE EMBODIMENT

Figure 1:
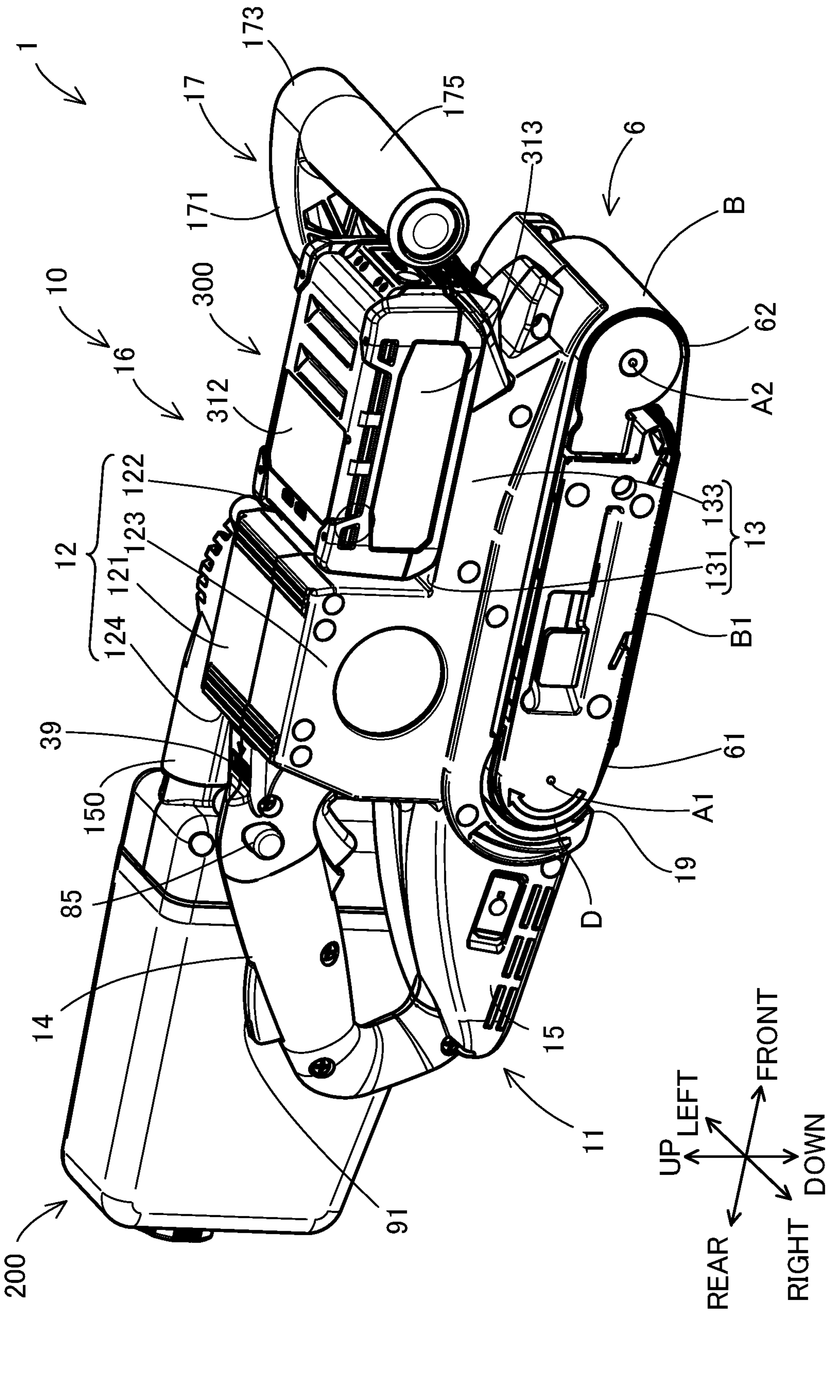
FIG. 1 is a perspective view of a belt sander, with a battery and a dust box mounted thereto.

In one non-limiting embodiment according to the present disclosure, the motor housing part may have an upper wall substantially parallel to the polishing surface. The battery mounting part may be provided below the upper wall in the up-down direction.

According to this embodiment, the belt sander with the battery mounted thereto can be more compact in the up-down direction.

In addition or in the alternative to the preceding embodiment, the battery mounting part may be configured such that the battery mounted to the battery mounting part does not protrude upward from the upper wall in the up-down direction.

According to this embodiment, the belt sander can be more compact in the up-down direction.

In addition or in the alternative to the preceding embodiments, the battery mounting part may be configured such that the battery mounted to the battery mounting part protrudes upward from the upper wall by a prescribed protruding length in the up-down direction. The protruding length may be 10% or less of a length of the battery in the up-down direction.

According to this embodiment, the belt sander with the battery mounted thereto can be more compact in the up-down direction.

In addition or in the alternative to the preceding embodiments, the battery mounting part may be configured such that the battery mounted to the battery mounting part does not protrude from a front end of the housing in the front-rear direction.

According to this embodiment, the belt sander with the battery mounted thereto can be more compact in the front-rear direction. Further, the possibility that the working range of the belt sander is restricted by contact of the battery mounted to the battery mounting part with a structure such as a wall located in front of the belt sander is reduced.

In addition or in the alternative to the preceding embodiments, the battery mounting part may be configured such that the battery mounted to the battery mounting part protrudes forward from a front end of the housing by a prescribed protruding length in the front-rear direction. The protruding length may be 10% or less of a length of the battery in the front-rear direction.

According to this embodiment, the belt sander with the battery mounted thereto can be more compact in the front-rear direction.

In addition or in the alternative to the preceding embodiments, the battery mounting part may be configured such that the battery mounted to the battery mounting part does not protrude from left and right ends of the housing in the left-right direction.

According to this embodiment, the belt sander with the battery mounted thereto can be more compact in the left-right direction. Further, the possibility that the working range of the belt sander is restricted by contact of the battery mounted to the battery mounting part with a structure such as a wall located on the left or right of the belt sander is reduced.

In addition or in the alternative to the preceding embodiments, the battery mounting part may be configured such that the battery mounted to the battery mounting part protrudes leftward or rightward from the left or right end of the housing by a prescribed protruding length in the left-right direction.

The protruding length may be 10% or less of a length of the battery in the left-right direction.

According to this embodiment, the belt sander with the battery mounted thereto can be more compact in the left-right direction.

In addition or in the alternative to the preceding embodiments, the sliding direction may be the front-rear direction. The battery mounting part may be configured such that the battery can be mounted to the battery mounting part by being slid in a direction from the front to the rear relative to the battery mounting part.

According to this embodiment, the direction (sliding direction) of mounting and removing the battery to and from the battery mounting part is the same front-rear direction as the extending direction of the first handle. Thus, the user can easily apply a force in a direction opposite to the mounting direction of the battery with the hand holding the first handle. Therefore, the user can stabilize the attitude of the belt sander with the hand holding the first handle when mounting the battery to the battery mounting part. Thus, the belt sander provides the advantage that the battery can be easily mounted to the battery mounting part.

In addition or in the alternative to the preceding embodiments, the battery mounting part may be configured such that the battery can be mounted thereto and removed therefrom by being slid in the left-right direction.

According to this embodiment, the user can mount the battery to the battery mounting part by sliding the battery in the left-right direction.

In addition or in the alternative to the preceding embodiments, the belt sander may further have a second handle that is turnable relative to the housing. The second handle may have an arm having a pivot axis extending in the left-right direction and connected to the housing, and a grip part connected to the arm and configured to be held by a user. The grip part may be configured to move to a first turning position and a second turning position according to turning of the second handle. In the first turning position, an upper end of the grip part is located substantially in the same position as an upper wall of the motor housing part in the up-down direction, and in the second turning position, the grip part is located below or above the battery.

According to this embodiment, in order to mount and remove the battery to and from the battery mounting part, the second handle is turned to move the grip part to the second turning position. Further, when the second handle is turned to move the grip part to the first turning position in order to use the belt sander in the second use mode, the upper wall of the housing and the second handle are placed in contact with a desk or the like. Therefore, the attitude of the belt sander in the second use mode is stabilized.

In addition or in the alternative to the preceding embodiments, the battery mounting part may be configured such that an upper surface of the battery mounted to the battery mounting part is located substantially in the same position as the upper wall in the up-down direction.

According to this embodiment, in the second use mode, the upper wall of the housing, the second handle and the upper surface of the battery are placed in contact with a desk or the like, so that the attitude of the belt sander is further stabilized.

First Embodiment

<The Overall Structure of the Belt Sander>

A belt sander 1 is now described as a representative embodiment according to the present disclosure. The belt sander 1 is capable of performing a working operation by driving a belt driving part 6, which holds an endless sanding belt B, by a motor 2, with the sanding belt B placed in contact (pressing contact) with a workpiece. In this embodiment, the belt sander 1 has a handle 14. A user can perform a working operation on a desired part of the workpiece by holding the handle 14 and moving the belt sander 1 while placing the sanding belt B in contact with the workpiece. The belt sander 1 described in this embodiment is also called as an "up-handle belt sander". The up-handle belt sander is a belt sander of a type that has the handle 14 and the motor 2 on a side opposite to a polishing (sanding) surface of the sanding belt B.

The overall structure of the belt sander 1 is now described with reference to FIGS. 1 to 7. The belt sander 1 mainly includes a housing 10, an electric motor 2, a fan 3, a power transmitting part 35, a belt driving part 6, a battery mounting part 4 and a switching mechanism 8.

The belt driving part 6 includes a drive roller 61, a driven roller 62 arranged on a side opposite to the drive roller 61, and a support frame 64 (see FIG. 6) that supports the rollers 61, 62 so as to be rotatable around their respective axes (rotational axes A1 and A2). The drive roller 61 and the driven roller 62 are arranged in parallel, and the endless sanding belt B is looped over the drive roller 61 and the driven roller 62. A plate for pressing the sanding belt B against a workpiece is arranged on a prescribed face of the support frame 64. The drive roller 61 is rotated in a direction of arrow D (see FIG. 1) by the motor 2.

In the following description, for convenience sake, the direction in which the drive roller 61 and the driven roller 62 are arranged in parallel is defined as a front-rear direction of the belt sander 1. In the front-rear direction, the side of the belt driving part 6 on which the drive roller 61 is arranged is defined as a rear side and the side on which the driven roller 62 is arranged is defined as a front side. A direction that crosses the front-rear direction and in which rotational axes A1, A2 of the drive roller 61 and the driven roller 62 extend is defined as a left-right direction of the belt sander 1. Further, a direction orthogonal to the front-rear direction and the left-right direction is defined as an up-down direction of the belt sander 1. In the up-down direction, the side of the belt sander 1 on which the belt driving part 6 is arranged is defined as a lower side, and the opposite side is defined as an upper side. A part of the sanding belt B that is exposed from the housing 10 functions as a polishing surface (sanding surface B1) for polishing a workpiece.

The housing 10 includes a body housing 11 and a side housing 16.

Figure 4:
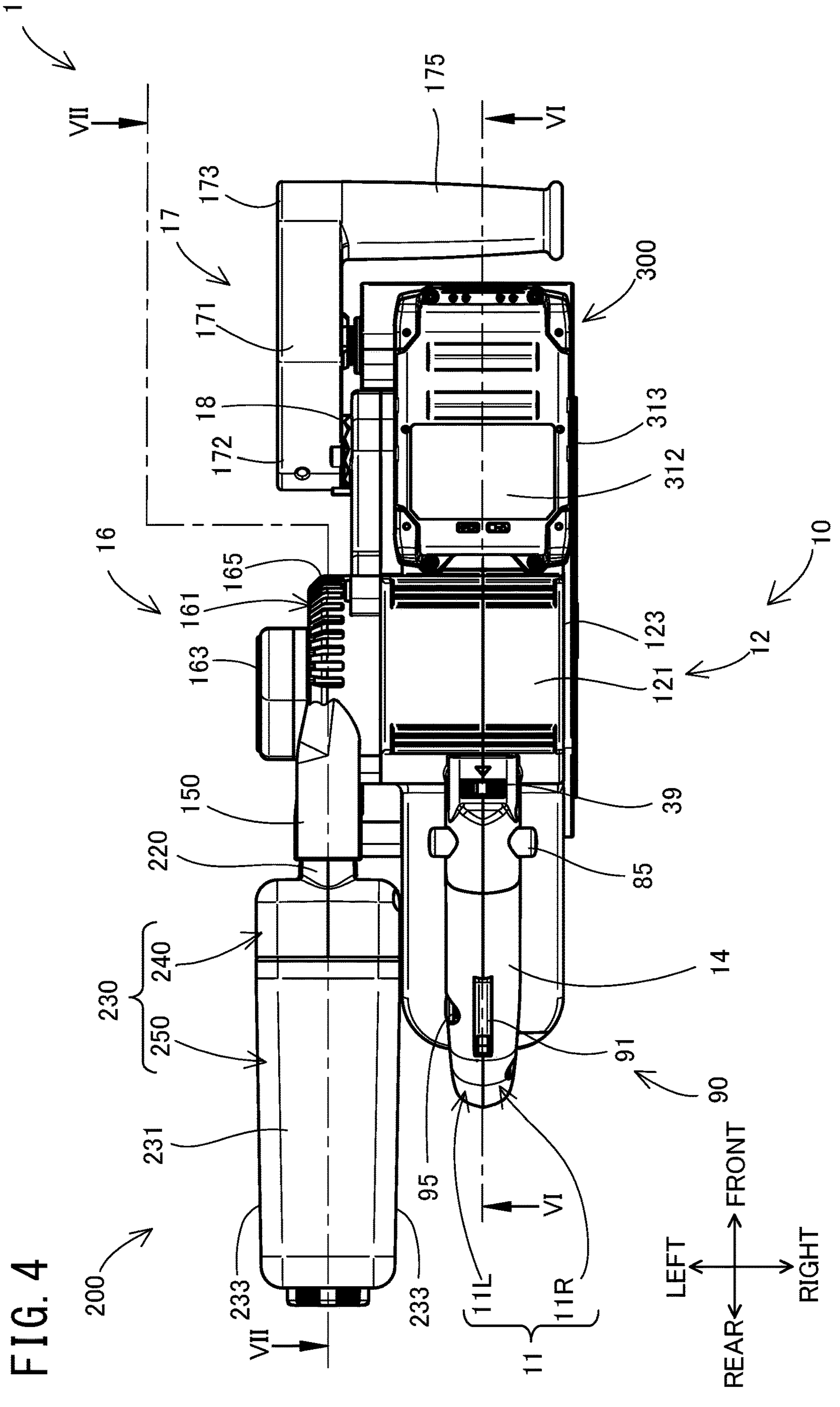
FIG. 4 is a top view of the belt sander, with the battery and the dust box mounted thereto.

The body housing 11 holds the belt driving part 6 with a lower end part of the belt driving part 6 exposed. The body housing 11 covers an upper part of the belt driving part 6 and an area behind a rear end part of the belt driving part 6 and substantially extends in the front-rear direction as a whole. In this embodiment, as shown in FIG. 4, the body housing 11 is formed by two halves, or a left body housing 11L and a right body housing 11R, fixed together with screws.

Figure 2:
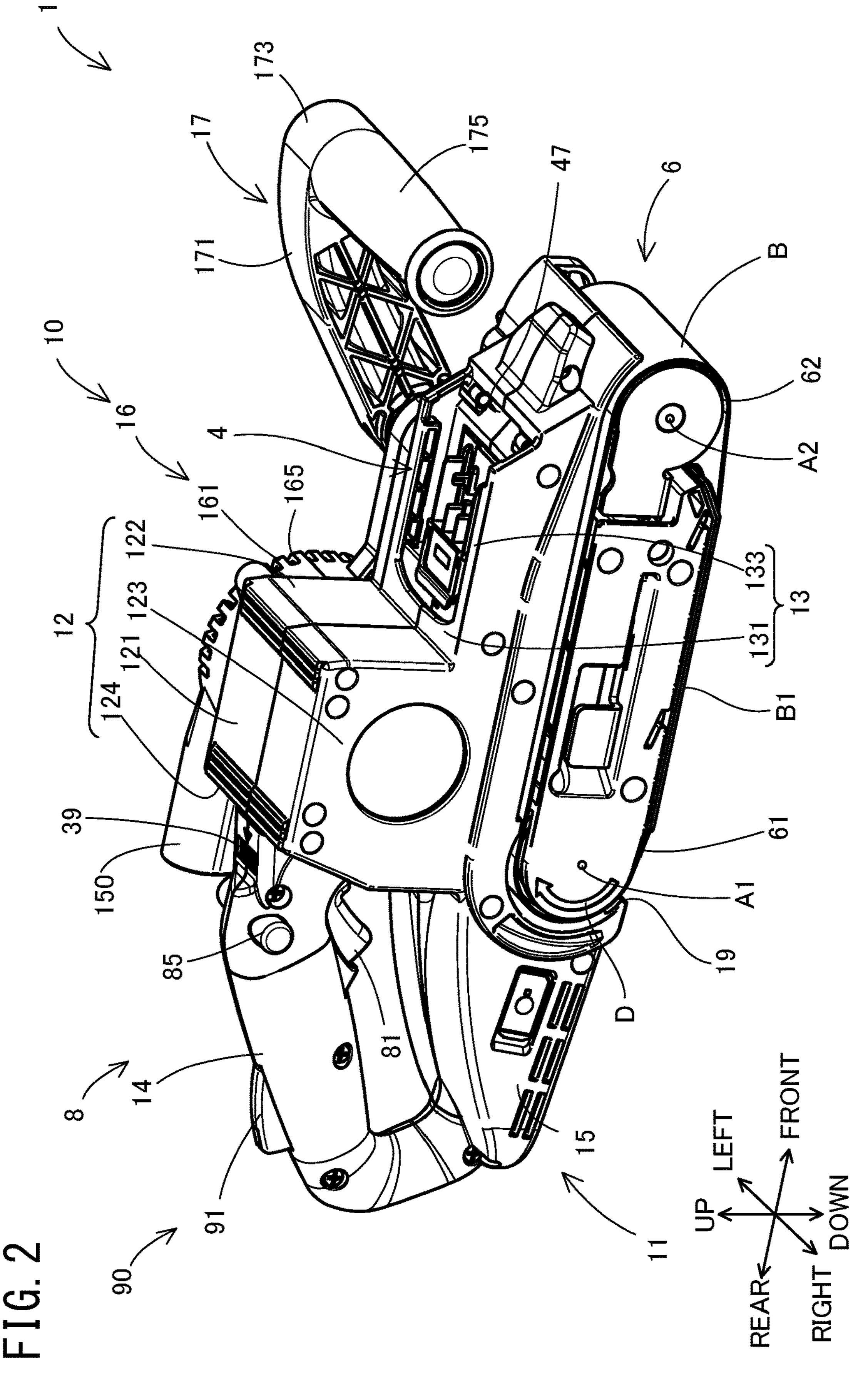
FIG. 2 is a perspective view of the belt sander.

As shown in FIG. 2, the body housing 11 includes a first part 12 and a second part 13 in front of the first part 12, directly above the belt driving part 6.

The first part 12 is formed directly above the belt driving part 6 and on the rear side substantially from the central position of the belt driving part 6 in the front-rear direction. The first part 12 mainly houses the motor 2. The first part 12 is also referred to as a "motor housing part". The first part 12 has a generally box-like shape including an upper wall 121, a front wall 122, side walls 123 and a rear wall 124. The upper wall 121 is substantially orthogonal to the up-down direction and substantially parallel to the sanding surface B1. The front wall 122 and the rear wall 124 are substantially orthogonal to the front-rear direction. The upper wall 121 may just be configured to, when the belt sander 1 is used in a second use mode, be placed on a desk or the like which may have a slightly uneven surface.

The second part 13 is formed directly above the belt driving part 6 and on the front side substantially from the central position of the belt driving part 6 in the front-rear direction. The second part 13 has side walls 133 formed continuously to the side walls 123 of the first part 12. The upper wall 131 of the second part 13 is located below the upper wall 121 of the first part 12. Thus, a part of the body housing 11 that is located above the belt driving part 6 has a stepped shape. The battery mounting part 4 is provided on the second part 13.

A part of the body housing 11 that extends rearward from the first part 12 forms the handle 14 extending in the front-rear direction. The handle 14 is connected to the first part 12 and extends in the front-rear direction. In this embodiment, the handle 14 is connected to an upper part of the rear wall 124 of the first part 12 and extends rearward and downward from the first part 12. An upper end of the handle 14 dose not protrude upward from the upper wall 121 of the first part 12. In this embodiment, the upper end of the handle 14 is located substantially in the same position as the upper wall 121 in the up-down direction. The handle 14 is also referred to as a "first handle".

A rear end part of the handle 14 is bent downward. The bent part is connected to a rear lower part of the first part 12. Thus, a rear part of the body housing 11 behind the belt driving part 6 has an annular shape.

A lower part of the handle 14 of the body housing 11, via which the rear end part of the handle 14 is connected to a part of the body housing 11 behind the belt driving part 6, forms a controller housing part 15. A front end part (directly behind the belt driving part 6) of the controller housing part 15 is curved along an outer edge of the drive roller 61. The body housing 11 is open in the left-right direction directly behind the belt driving part 6. This opening functions as a dust collection port 19 through which dust generated by working operation is introduced to a dust passage (a first passage 191) provided within the housing 10.

Figure 6:
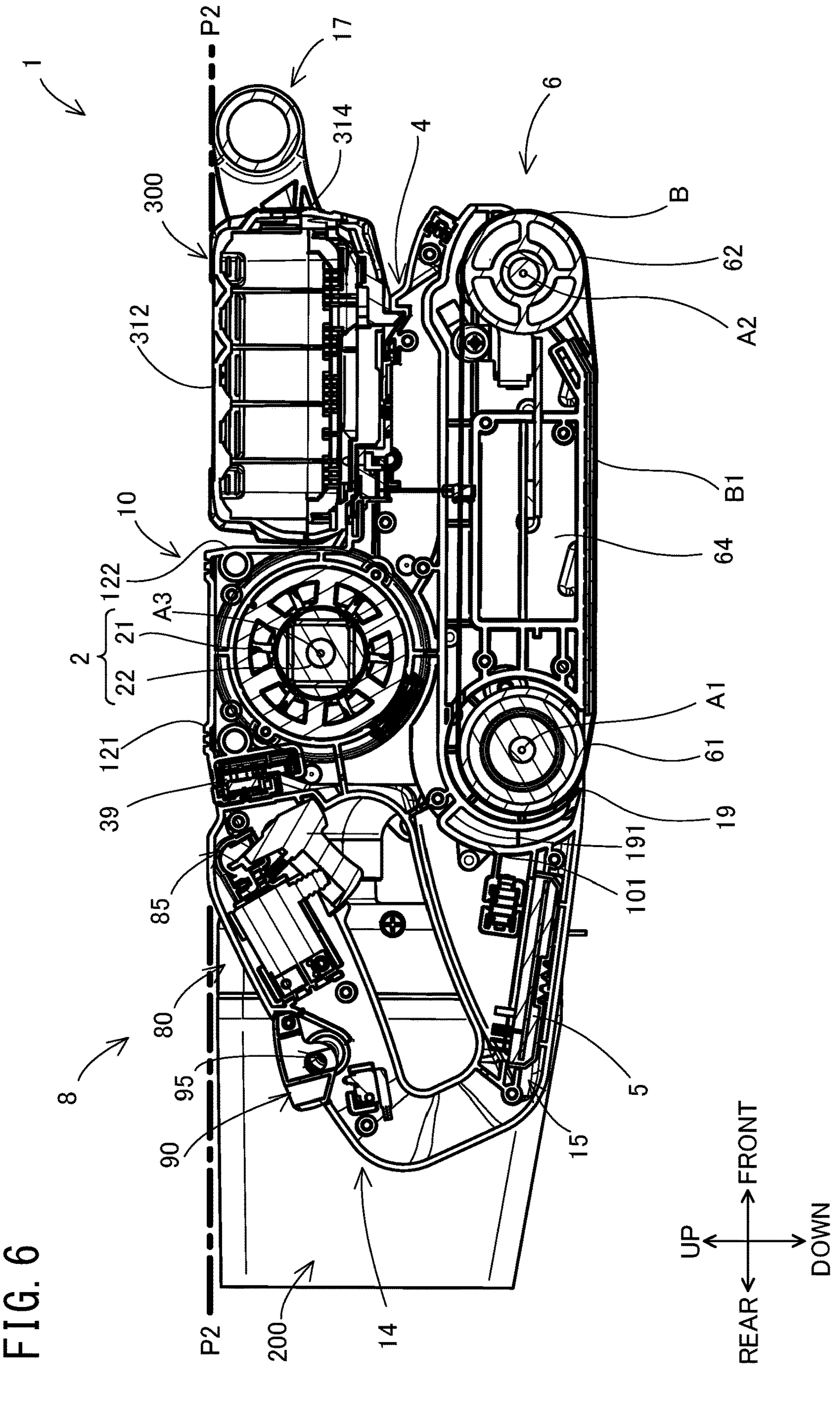
FIG. 6 is a sectional view taken along line VI-VI in FIG. 4.

As shown in FIG. 6, the switching mechanism 8 is provided behind the motor 2 within the body housing 11. The switching mechanism 8 includes a first switch 80, a second switch 90, a first lock switch 85 and a second lock switch 95 (see FIG. 4), which can be manually operated by a user. The switching mechanism 8 will be described in detail below.

A dial 39 for adjusting the speed of the motor 2 is provided on an upper part of the body housing 11 behind the motor 2. An upper end of the dial 39 is exposed from the upper wall 121 of the body housing 11. The dial 39 is configured such that the attitude (rotational position) of the dial 39 can be changed by manual operation of a user. The dial 39 is connected to a controller 5 via wiring. The controller 5 is configured to set the speed of the motor 2 according to the rotational position of the dial 39.

As shown in FIG. 6, the controller 5 is mounted on a main board arranged within a case of the controller housing part 15. In this embodiment, the controller 5 is configured as a microcomputer including a CPU and a memory. The controller 5 is configured to control various operations of the belt sander 1, including drive control of the motor 2. The controller 5 is connected to the battery mounting part 4, the motor 2 and the first and second switches 80, 90 of the switching mechanism 8 via wiring (not shown). The controller 5 is configured to supply power of a battery 300 mounted to the battery mounting part 4, to the motor 2 when the first and second switches 80, 90 are in an ON state. Then, the motor 2 is rotated and the belt driving part 6 is driven via the power transmitting part 35. Thus, the sanding belt B is rotated in the direction of arrow D. Further, the controller 5 is configured not to supply power to the motor 2 when at least one of the first and second switches 80, 90 is in an OFF state.

Figure 3:
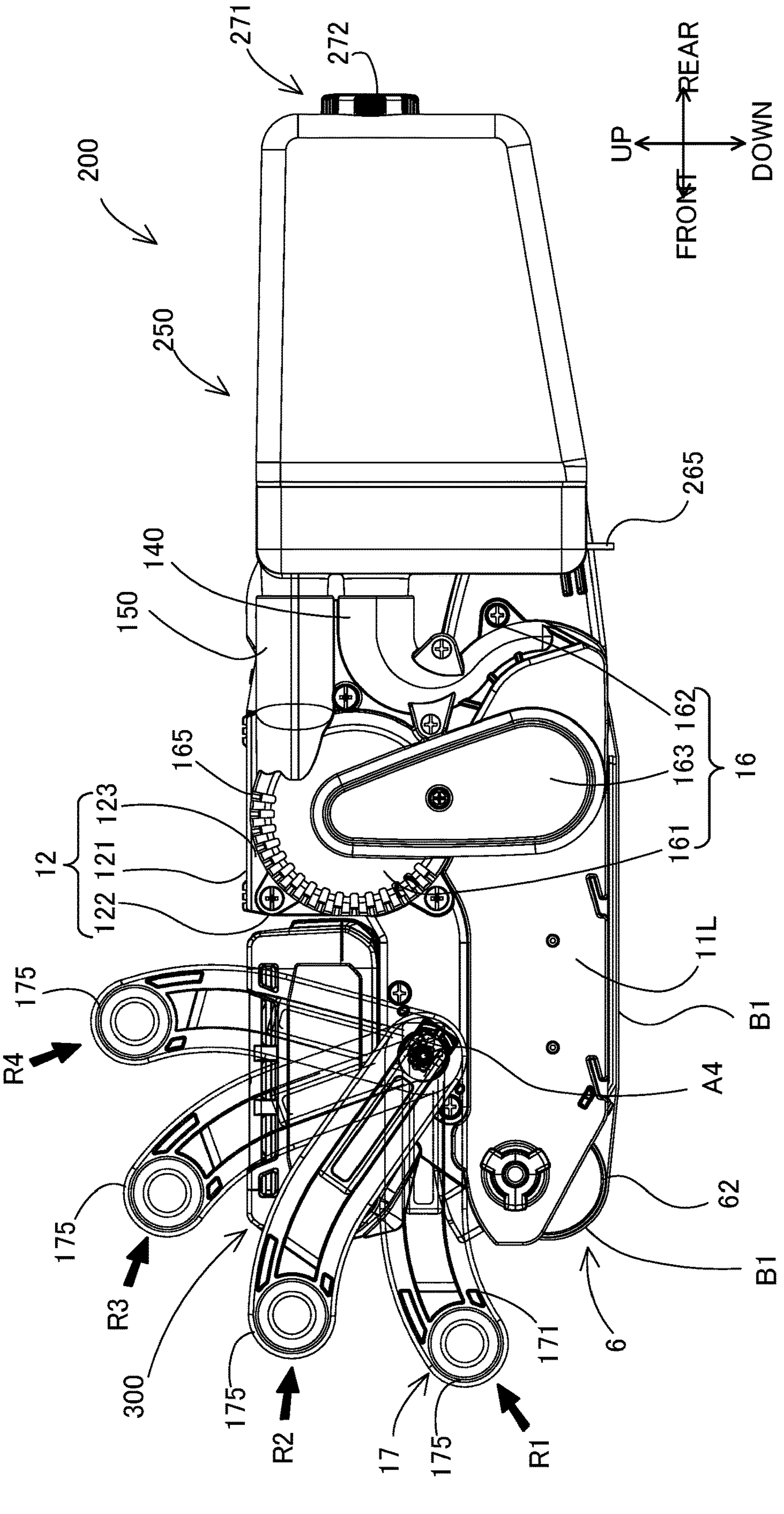
FIG. 3 is a left side view of the belt sander, with the battery and the dust box mounted thereto, for showing a turning range of a front handle.

Part of the left side wall 123 of the first part 12 is open and covered by the side housing 16. As shown in FIGS. 3 and 4, the side housing 16 includes a fan housing 161 for covering the left side of the fan 3, a gear cover 162 for covering part of the power transmitting part 35, and a belt cover 163 for covering an endless synchronous belt that is part of the power transmitting part 35. The side housing 16 is fixed to the left body housing 11L with screws.

The motor 2 is driven by power supplied from the battery 300 mounted to the battery mounting part 4. In this embodiment, a brushless DC motor is used as the motor 2. As shown in FIG. 6, the motor 2 has a motor body 21 having a stator and a rotor, and a shaft 22 that extends from the rotor and rotates integrally with the rotor. The shaft 22 (a rotational axis A3 of the shaft 22) extends in the left-right direction. The shaft 22 is supported by the body housing 11 via a bearing.

Figure 7:
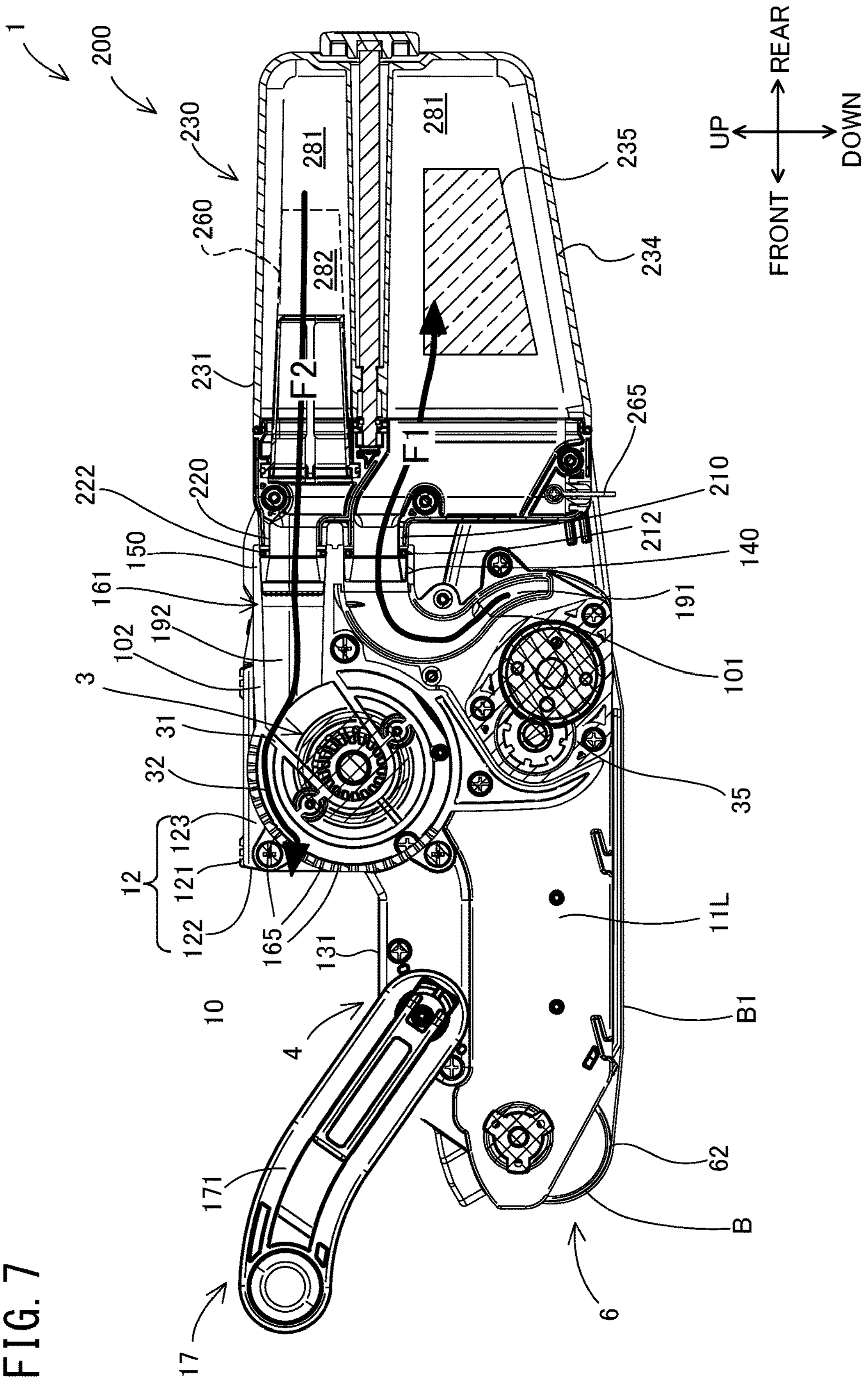
FIG. 7 is a sectional view taken along line VII-VII in FIG. 4.

As shown in FIG. 7, the power transmitting part 35 is held by the side housing 16 and configured to transmit rotation of the shaft 22 to the drive roller 61. The power transmitting part 35 includes a pulley part including a pulley integrally formed with a left end part of the shaft 22, an endless synchronous belt and a gear mechanism for reducing the rotation speed of the shaft 22.

The fan 3 is configured to have a function of cooling the motor 2 and a function as a dust collecting fan. The fan 3 generates an air flow for cooling the motor 2 and an air flow for sucking dust generated by working operation into the housing 10 and discharging the dust into a dust box 200.

In this embodiment, the fan 3 is housed on the left side of the motor body 21 mostly in the first part 12 of the body housing 11. The fan 3 is fixed between the motor body 21 and a bearing onto the shaft 22 and rotates integrally with the shaft 22. Part of the left wall 123 of the first part 12 is open as described above, and a back side of the fan 3 is covered by the side housing 16 (a fan housing 161). A front part of the fan housing 161 is curved along an outer edge of the fan 3. A plurality of small openings (air outlets 165) are formed in the curved part of the fan housing 161 (see FIGS. 4 and 7, for example).

The fan 3 of this embodiment is configured as a centrifugal fan. The fan 3 sucks air from the back side of the fan 3 (the left side of the belt sander 1) and discharges the air radially in a direction crossing the rotational axis A3 of the shaft 22. The discharged air is led to the motor 2 by a plurality of small blades formed on a front side of the fan 3 (on the right side of the belt sander 1) and a baffle plate 32 provided on the front side of the fan 3. Further, a guide plate 31 is provided on the back side of the fan 3 and connected to a suction nozzle 150 (described below). When the fan 3 is rotated, the fan 3 sucks air from the back side and radially discharges the air and then sends the discharged air to the motor 2, as well as sending air within the housing 10 to the air outlets 165.

<The Structures of the Dust Box and the Belt Sander for collecting dust in the dust box>

The belt sander 1 of this embodiment is configured such that the dust box 200 is removably mounted thereto. The structure of the belt sander 1 for collecting dust in the dust box 200 and the structure of the dust box 200 are now described.

As shown in FIGS. 3 and 7, the housing 10 of the belt sander 1 has two tubular parts (a discharge nozzle 140 and a suction nozzle 150). The discharge nozzle 140 and the suction nozzle 150 are formed on a rear upper part of the side housing 16 and extend in the front-rear direction. The discharge nozzle 140 and the suction nozzle 150 are arranged side by side in the up-down direction, and the discharge nozzle 140 is arranged below the suction nozzle 150. The discharge nozzle 140 and the suction nozzle 150 are open to the rear.

As described above, the body housing 11 has the dust collection port 19 that is open in the left-right direction directly behind the belt driving part 6. The first passage 191 for communication between the dust collection port 19 and the discharge nozzle 140 is formed within the housing 10. In this embodiment, the first passage 191 is defined by a partition 101 provided within the housing 10 and a tubular wall of the discharge nozzle 140. The partition 101 is provided continuously within a rear lower part of the body housing 11, a rear part of the gear cover 162 and a rear part of the fan housing 161. The first passage 191 is separated from spaces where parts including the motor 2, the fan 3 and the power transmitting part 35 are housed, by the partition 101 and the tubular wall of the discharge nozzle 140. Therefore, the possibility of air and dust flowing through the first passage 191 entering the housing parts (spaces) for the motor 2, the fan 3 and the power transmitting part 35 is reduced.

As shown in FIG. 7, a second passage 192 for communication between the suction nozzle 150 and the air outlets 165 is formed within the housing 10. The second passage 192 communicates with the space where the fan 3 is housed within the housing 10. The second passage 192 is mainly defined by a tubular wall of the suction nozzle 150, the guide plate 31, and a wall part 102 forming the fan housing 161.

The structure of the dust box 200 is now described with reference to FIGS. 7 to 11. The dust box 200 is formed to extend in a prescribed direction as a whole. The dust box 200 has a first nozzle 210 and a second nozzle 220 that extend in this prescribed direction, a container part 230 connected to the first and second nozzles 210, 220, and a filter 260 provided within the container part 230. The first and second nozzles 210, 220 and the container part 230 are formed of an air impermeable (airtight) material. In this embodiment, the first and second nozzles 210, 220 and the container part 230 are formed of conductive synthetic resin.

Figure 8:
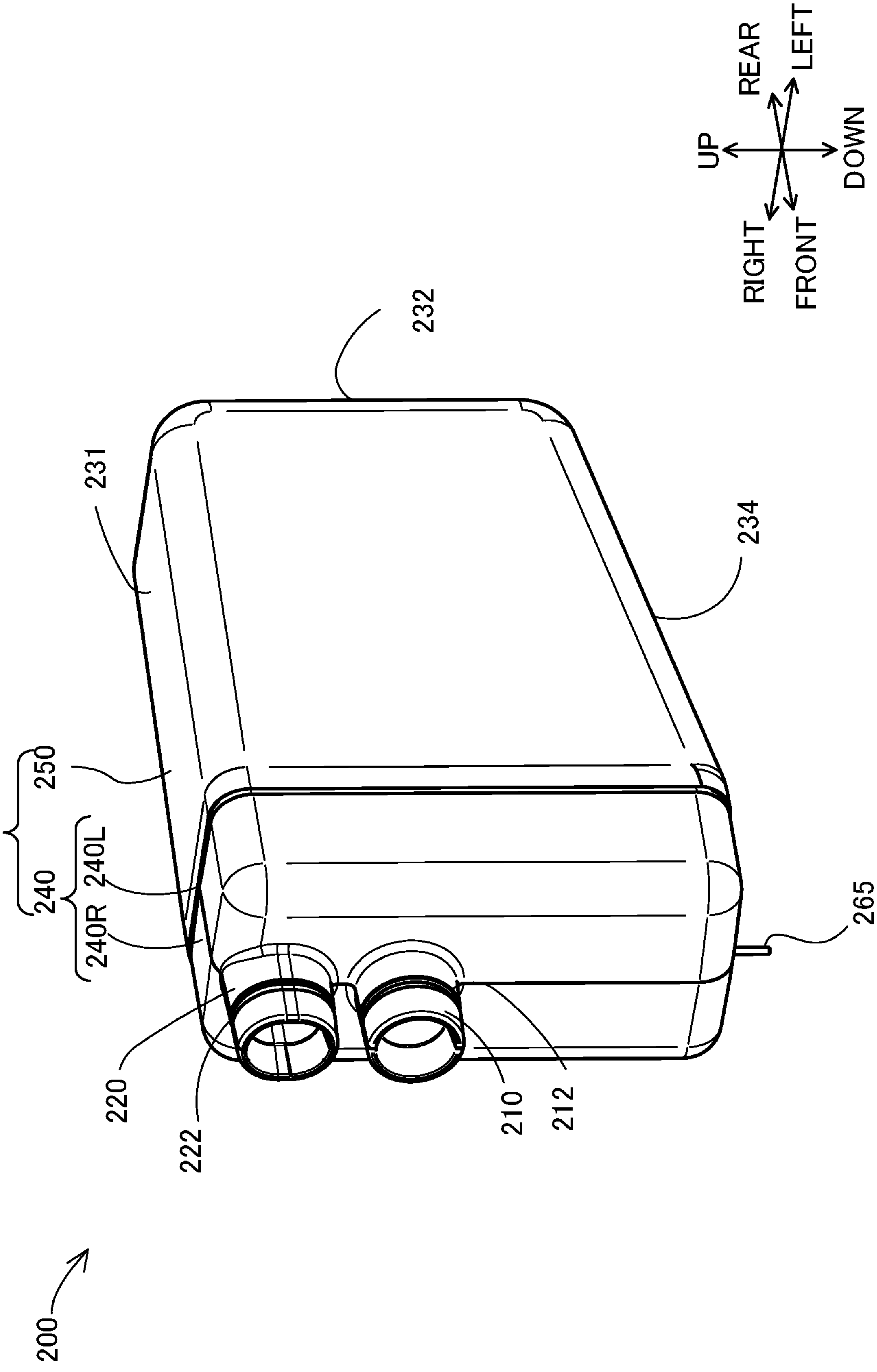
FIG. 8 is an external, perspective view of the dust box.

In FIG. 8, the up-down direction, the front-rear direction and the left-right direction are shown for the dust box 200 attached to the belt sander 1. The dust box 200 attached to the belt sander 1 extends in the front-rear direction as a whole. The first and second nozzles 210, 220 extend in the front-rear direction and are open to the front. The first and second nozzles 210, 220 are arranged side by side in the up-down direction, and the first nozzle 210 is arranged below the second nozzle 220. The dust box 200 is attached to the belt sander 1 by inserting the first and second nozzles 210, 220 respectively into the discharge nozzle 140 and the suction nozzle 150 of the belt sander 1. The first passage 191 of the belt sander 1 communicates with the inside of the first nozzle 210 (the inside of the dust box 200) by insertion of the first nozzle 210 into the discharge nozzle 140. The second passage 192 of the belt sander 1 communicates with the inside of the second nozzle 220 (the inside of the dust box 200) by insertion of the second nozzle 220 into the suction nozzle 150. Further, O-rings 212, 222 are fitted onto outer peripheral walls of the first and second nozzles 210, 220, respectively, so that the connection parts of these nozzles are kept airtight.

The container part 230 has a generally box-like shape extending in the front-rear direction. The length of the container part 230 in the left-right direction is shorter than the lengths of the container part 230 in the up-down direction and in the front-rear direction. An upper wall (an upper surface 231) of the container part 230 is substantially orthogonal to the up-down direction. A lower wall (a lower surface 234) of the container part 230 is inclined rearward and upward. As shown in FIG. 4, the container part 230 is located on the left side of the handle 14 and the controller housing part 15 with the dust box 200 attached to the belt sander 1.

The dust box 200 is configured to be fitted within the widths (lengths) of the housing 10 in the up-down direction and the left-right direction when attached to the belt sander 1. Further, the dust box 200 is configured such that the lower surface 234 is located above the sanding surface B1 in the up-down direction when attached to the belt sander 1. In this embodiment, as shown in FIG. 4, a left side surface 233 of the container part 230 is located substantially in the same position in the left-right direction as a left surface of the housing 10 (a left surface of the fan housing 161). Further, as shown in FIG. 7, the upper surface 231 of the container part 230 is located substantially in the same position in the up-down direction as an upper end (the upper wall 121) of the belt sander 1.

Figure 10:
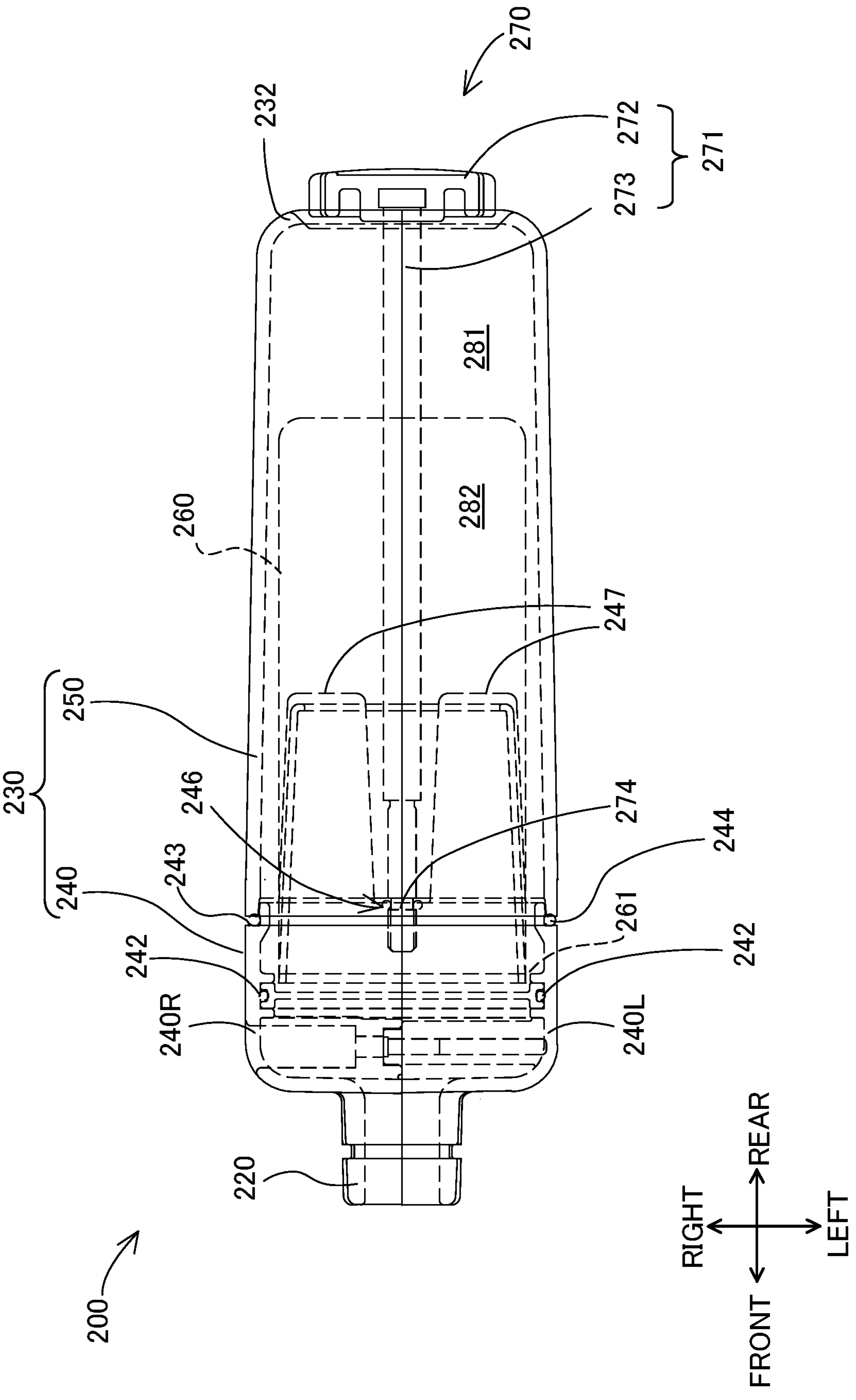
FIG. 10 is a top view of the dust box, showing the inside by broken lines.
Figure 11:
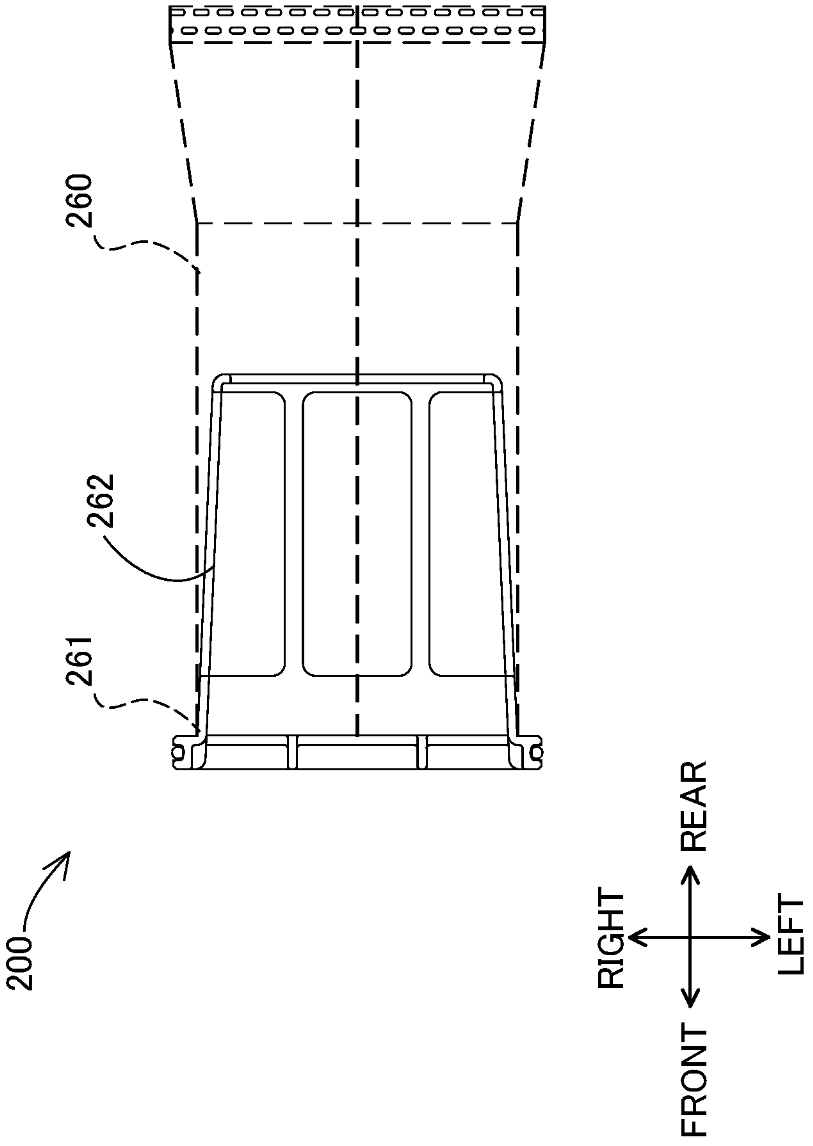
FIG. 11 shows a filter and a frame.

The container part 230 is configured to be divided into a nozzle connection part 240 and a body part 250. The nozzle connection part 240 is a front part of the container part 230 and is connected to the first and second nozzles 210, 220. In this embodiment, the nozzle connection part 240 is integrally formed with the first and second nozzles 210, 220. As shown in FIG. 10, the first and second nozzles 210, 220 and the nozzle connection part 240 are formed by two halves, or a left nozzle part 240L and a right nozzle part 240R, fixed together with screws. An O-ring 244 is fitted onto an outer periphery of a rear end part 243 of the nozzle connection part 240.

Figure 9:
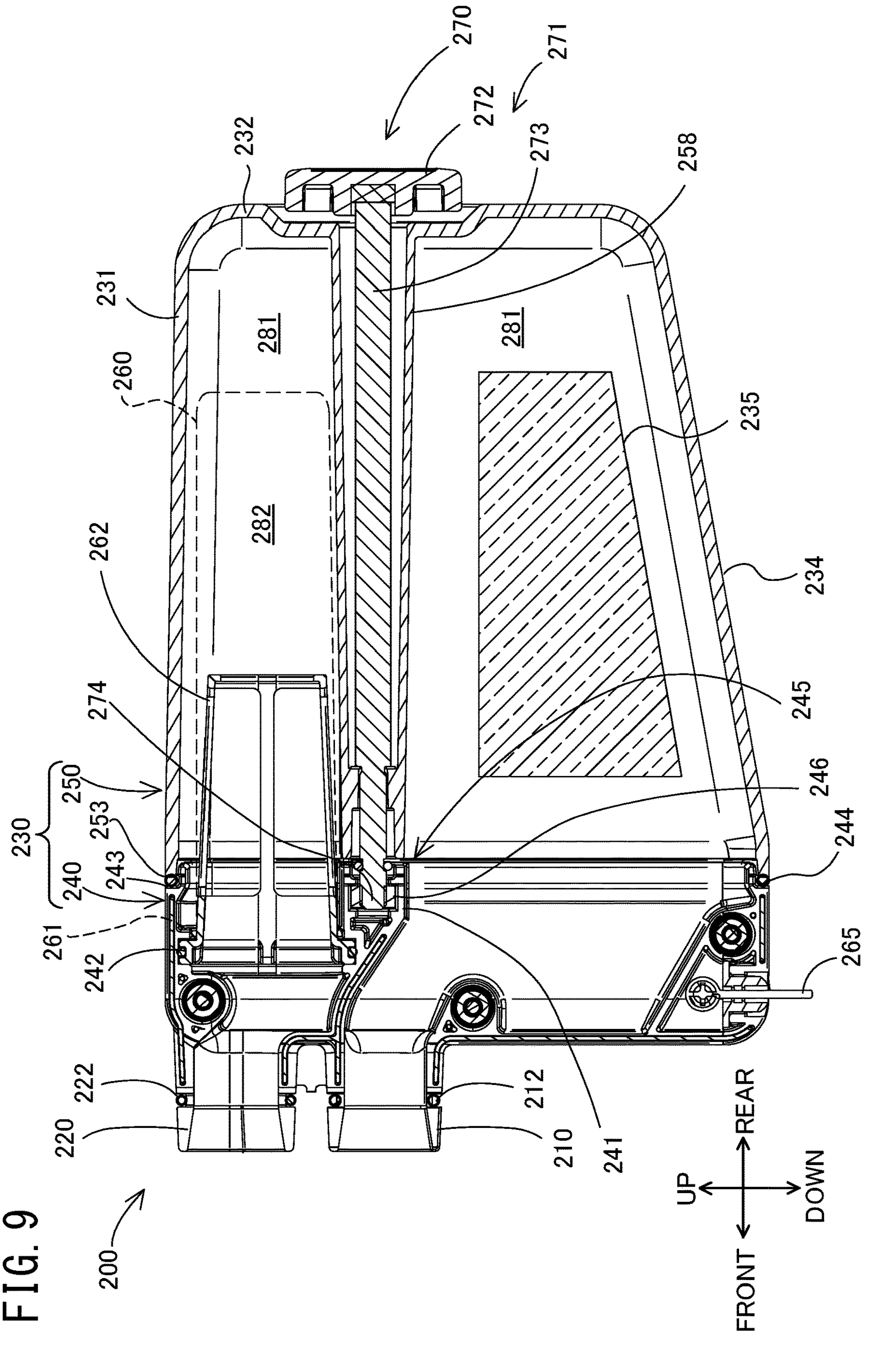
FIG. 9 is a sectional view of the dust box, taken along line VII-VII in FIG. 4.

The body part 250 is a rear part of the container part 230. The body part 250 has a generally box-like shape having an open front end. In this embodiment, the container part 230 is formed of carbon resin. As shown in FIG. 9, the container part 230 has a window part 235 formed of light transmitting resin. A user can visually check the amount of dust within the container part 230 via the window part 235.

As shown in FIG. 9, the dust box 200 further has an attaching/detaching part 270 configured to attach and detach the body part 250 to and from the nozzle connection part 240. In this embodiment, the attaching/detaching part 270 includes a mounting screw 271 provided on the body part 250, and an engagement part 245 provided on the nozzle connection part 240. The mounting screw 271 has a knob 272 and a shaft 273. The engagement part 245 is configured to be engaged with a front end part 274 of the mounting screw 271.

A tubular part 258 is provided inside the body part 250 and extends forward from a rear wall 232 of the container part 230. The tubular part 258 has a rear end opening formed in the rear wall 232. The knob 272 is arranged on the rear side of the rear wall 232 and covers this opening. The shaft 273 is connected to the knob 272 and arranged within the tubular part 258. The nozzle connection part 240 has a partition 241 provided between the first nozzle 210 and the second nozzle 220 in the up-down direction, and the engagement part 245 is formed by an opening formed in the partition 241 and engagement members including a nut 246 arranged in the opening. The partition 241 partitions the inside of the nozzle connection part 240 into a space that communicates with the first nozzle 210 and a space that communicates with the second nozzle 220.

A method of fitting the body part 250 to the nozzle connection part 240 is now described. A user positions and aligns the body part 250 having the mounting screw 271 mounted thereto and the nozzle connection part 240 with each other such that an external contour (for example, the side surface 233) formed by connecting the body part 250 and the nozzle connection part 240 is continuous. The user then inserts the front end part 274 of the shaft 273 into the opening of the engagement part 245 while fitting a front end part 253 of the body part 250 into the rear end part 243 of the nozzle connection part 240. When the user manually operates (turns) the knob 272, the front end part 274 of the shaft 273 is inserted into the opening of the engagement part 245 and engaged (fitted) with the engagement part 245. In this manner, the body part 250 is fitted to the nozzle connection part 240.

The filter 260 is arranged within the container part 230 so as to partition the space inside the container part 230 into a first space 281 that communicates with the first nozzle 210 and a second space 282 that communicates with the second nozzle 220. The filter 260 is arranged closer to the second nozzle 220 than to the first nozzle 210. The filter 260 is configured to allow air to pass therethrough but not to allow dust generated by working operation to pass therethrough. In this embodiment, a bag-like air filter having an opening 261 is used as the filter 260. The air filter is, for example, a filter for coarse dust.

In this embodiment, a frame 262 is arranged inside the filter 260. The frame 262 is configured to expand the filter 260 so as to keep the bag-like shape. As shown in FIG. 9, a groove 242 is formed behind the second nozzle 220 above the partition 241 in an inner wall of the nozzle connection part 240 and configured such that the frame 262 is removably fixed thereto. The filter 260 is fixed to the groove 242 via the frame 262 such that the opening 261 faces the second nozzle 220 side (forward). It can also be said that the filter 260 is mounted to a part (second nozzle connection part) of the nozzle connection part 240 that is connected to the second nozzle 220. As shown in FIG. 10, a plate 247 extending rearward from the partition 241 supports a lower end part of the filter 260.

The dust box 200 further has a string-like earth (ground) member 265. The earth member 265 is provided to keep the potential of the dust box 200 equal to that of the ground. One end part of the earth member 265 is arranged in contact with the container part 230 and the other end part is exposed from the container part 230. The length of exposure of the earth member 265 is set such that the other end part of the earth member 265 can come into contact with a workpiece or an object on the same plane as the workpiece when the sanding surface B1 is placed on the workpiece. In this embodiment, the earth member 265 is arranged in a lower end part of the nozzle connection part 240 so as to be apart from the space (the first space 281) of the container part 230. The earth member 265 discharges electric charge accumulated in the dust box 200.

Effects of the dust box 200 and the belt sander 1 having the dust box 200 attached thereto according to this embodiment are now described as well as the manner in which dust is stored (collected) in the dust box 200.

When the dust box 200 is attached to the belt sander 1 by connecting the first and second nozzles 210, 220 of the dust box 200 respectively to the discharge nozzle 140 and the suction nozzle 150 of the belt sander 1, the first passage 191 of the belt sander 1 communicates with the first space 281 of the dust box 200, and the second passage 192 of the belt sander 1 communicates with the second space 282 of the dust box 200. As described above, the first space 281 is separated from the second space 282 by the filter 260, so that air within the dust box 200 is allowed to move between the first and second spaces 281, 282.

When the belt sander 1 is driven, the fan 3 rotates and sucks air from the back side. At this time, by air suction of the fan 3, air around the fan 3 is led from the suction nozzle 150 toward the air outlets 165. In other words, by rotation of the fan 3, air flow F2 is generated from the inside of the dust box 200 toward the air outlets 165 through the second passage 192 (see FIG. 7). Further, the pressure inside the dust box 200 becomes negative by air suction of the fan 3, so that air flow F1 is generated from the dust collection port 19 (provided behind the belt driving part) toward the inside of the dust box 200 through the first passage 191. Therefore, dust generated by working operation is led from the dust collection port 19 to the first passage 191, the discharge nozzle 140, the first nozzle 210, and the first space 281 of the container part 230, in this order. Dust flowing into the container part 230 is prevented from moving into the second space 282 by the filter 260 and thus stored in the first space 281. In this manner, dust is stored in the first space 281. Further, air within the dust box 200 passes through the filter 260 and flows from the first space 281 to the second space 282, the second nozzle 220, the suction nozzle 150, the second passage 192 and the air outlets 165, in this order, and then the air is discharged to the outside of the belt sander 1.

Thus, according to this embodiment, when the first and second nozzles 210, 220 of the dust box 200 are respectively connected to the discharge nozzle 140 and the suction nozzle 150 of the belt sander 1 and the fan 3 is rotated, air flow is generated from the dust collection port 19 of the belt sander 1 toward the air outlets 165 of the belt sander 1 through the inside of the dust box 200. Further, the filter 260 partitions the space of the container part 230 into the first space 281 that communicates with the first nozzle 210 and the second space 282 that communicates with the second nozzle 220, so that dust is stored in the dust box 200 and restrained from entering the housing 10 from the second nozzle 220. Therefore, the dust box 200 and the belt sander 1 having the dust box 200 attached thereto according to this embodiment provide improved dust collecting efficiency.

As described above, the first passage 191 is separated from the spaces where parts including the motor 2, the fan 3 and the power transmitting part 35 are housed, by the partition 101 and the tubular wall of the discharge nozzle 140. Therefore, air and dust flowing through the first passage 191 does not enter the housing parts (spaces) for the motor 2, the fan 3 and the power transmitting part 35. Further, air flows from the dust box 200 into the second passage 192 after dust is removed from the air by the filter 260. Therefore, adhesion of dust generated by working operation to the motor 2, the fan 3 and the power transmitting part 35 within the housing 10 is suppressed, so that the life of the belt sander 1 is elongated.

In the dust box 200, the first nozzle 210 through which dust enters is arranged below the second nozzle 220 through which air is sucked. Therefore, dust need not be transferred up to an upper part within the container part 230, so that a path for storing dust within the container part 230 can be shorter. Thus, the dust collecting efficiency is improved.

The filter 260 is fixed to the groove 242 formed behind the second nozzle 220, via the frame 262. Thus, the filter 260 is arranged closer to the second nozzle 220 than to the first nozzle 210. Therefore, the first space 281 in which dust is stored can be formed large relative to the second space 282 that communicates with the second nozzle 220.

The first and second nozzles 210, 220 are arranged side by side in the up-down direction and are open to the rear. This structure suppresses complication of air flow within the container part 230 that may be caused by a structure in which the first and second nozzles 210, 220 are open in different directions. Therefore, air flow within the container part 230 can be smoother, so that the dust collecting efficiency is more improved.

Further, the container part 230 has the nozzle connection part 240 that is connected to the first and second nozzles 210, 220, and the body part 250 that is removably fitted to the nozzle connection part 240, and the filter 260 is mounted to the nozzle connection part 240. Therefore, dust stored within the container part 230 can be removed by detaching the body part 250 from the nozzle connection part 240.

Dust, which is blocked by the filter 260 when air flows into the filter 260 (the second space 282), may adhere to an outer surface of the filter 260. In this embodiment, however, the filter 260 is mounted to the nozzle connection part 240, so that a user can easily remove dust adhered to the outer surface of the filter 260 when detaching the body part 250 from the nozzle connection part 240. Thus, the filter 260 can be avoided from being covered with dust, so that the dust collecting efficiency is more improved.

The dust box 200 has the attaching/detaching part 270 configured to attach and detach the body part 250 to and from the nozzle connection part 240. Therefore, the user need not separately prepare a tool for attaching and detaching the body part 250 to and from the nozzle connection part 240, so that the convenience in use of the dust box 200 is improved.

In the belt sander 1, dust flows through the first passage 191 within the housing 10, so that static electricity is easily generated by friction between the dust and the housing 10. In this embodiment, however, the dust box 200 has the earth member 265 having one end part arranged in contact with the container part 230 formed of conductive synthetic resin, and the other end part exposed from the container part 230. Therefore, the generated static electricity is discharged via the earth member 265. Thus, dust is avoided from staying in a certain place of the dust box 200 by the static electricity, so that the dust collecting efficiency is further improved.

The dust box 200 is configured to be fitted within the widths (lengths) of the housing 10 in the up-down direction and the left-right direction when attached to the belt sander 1. With this configuration, the possibility that the working range of the belt sander 1 is restricted by contact of the dust box 200 with a structure such as a wall located on the right or left of the belt sander 1 is reduced. Further, when the belt sander 1 is used in the second use mode, the possibility that the dust box 200 comes into contact with a desk or the like on which the belt sander 1 is placed is reduced.

<Other Embodiments of the Dust Box and the Belt Sander for Collecting Dust in the Dust Box>

The dust box 200 may only have the first nozzle 210 configured to be connected to the discharge nozzle 140, the second nozzle 220 configured to be connected to the suction nozzle 150, the container part 230 and the filter 260. The shapes and materials of these parts may be different from those of the above-described embodiment. For example, the container part 230 may be formed of bag-shaped vinyl. The filter 260 may only be formed to allow air to pass therethrough but not to allow dust generated by working operation of the belt sander 1 to pass therethrough.

In the above-described embodiment, the opening 261 of the filter 260 is mounted to a part (the second nozzle connection part) of the nozzle connection part 240 that is connected to the second nozzle 220, but the filter 260 may be mounted to the second nozzle 220.

<The Structure of the Switching Mechanism>

Figure 12:
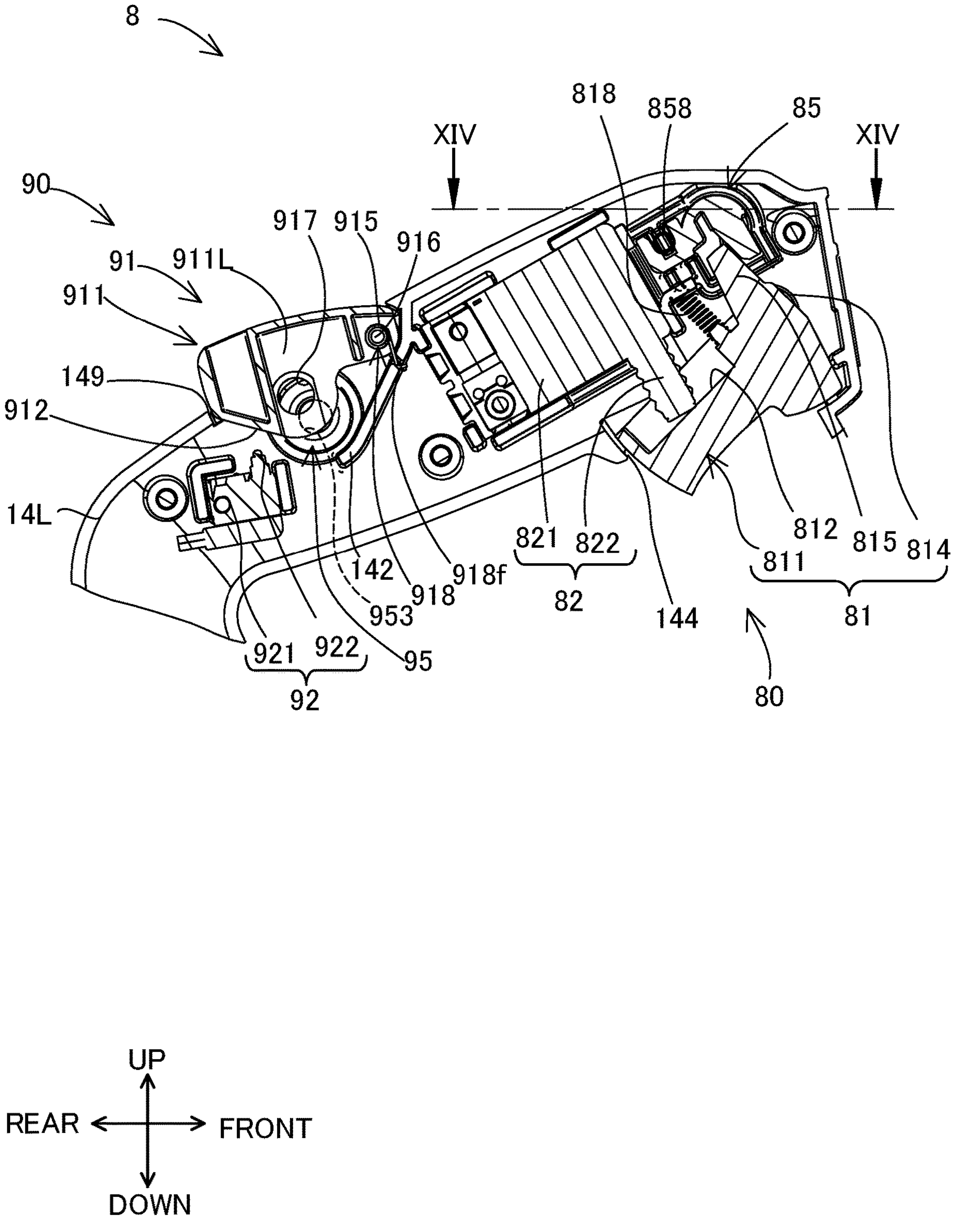
FIG. 12 is a partial, enlarged view of FIG. 6, showing a switching mechanism.

The overall structure of the switching mechanism 8 is now described. The switching mechanism 8 is configured to be manually operated by a user to switch between driving and stopping of the motor 2 and thereby switch between driving and stopping of the belt sander 1. As shown in FIG. 6, the switching mechanism 8 includes the first switch 80, the second switch 90, the first lock switch 85 and the second lock switch 95. In FIGS. 14 to 18, a plane P1 including a longitudinal axis of the handle 14 and orthogonal to the left-right direction is shown as an imaginary plane for the purpose of explaining the structure of the switching mechanism 8. FIG. 12 is a sectional view of the switching mechanism 8 taken along the plane P1 in the state (normal state) where the belt sander 1 is stopped.

As shown in FIG. 12, part of the first switch 80 protrudes downward from an opening 144 formed in a front lower part of the handle 14. The first switch 80 is configured to be depressed relative to the handle 14 by a user. The first switch 80 is also referred to as a depressing switch or a trigger switch. Part of the second switch 90 protrudes upward from an opening 149 formed in a rear upper part of the handle 14. The second switch 90 is configured to be pushed relative to the handle 14 by a user. The first and second switches 80, 90 are each configured as a momentary switch.

As shown in FIGS. 4 and 12, the first lock switch 85 is provided in a front part of the handle 14 and configured to act on the first switch 80. The first lock switch 85 is configured to have a function of restricting the first switch 80 from being turned on or placed in the ON state (a function of keeping the first switch 80 in the OFF state, a lock-off function). The first lock switch 85 is further configured to have a function of maintaining the ON state of the first switch 80 (a lock-on function). The first lock switch 85 is also referred to as a lock-on/lock-off switch. The second lock switch 95 is provided in a left rear part of the handle 14 and configured to act on the second switch 90. The second lock switch 95 is configured to have a function of maintaining the ON state of the second switch 90 (a lock-on function). The second lock switch 95 is also referred to as a lock-on switch.

The controller 5 is configured to rotate the motor 2 when both of the first and second switches 80, 90 are in the ON state. The controller 5 is configured to stop rotation of the motor 2 when at least one of the first and second switches 80, 90 is in the OFF state.

As described above, a user can use the belt sander 1 of this embodiment in first and second use modes. The first use mode is a normal use mode in which the sanding surface B1 is placed on a workpiece and a user performs a working operation while holding the handle 14. In the second use mode, the belt sander 1 is set upside down, for example, on a stand or a desk, with the sanding surface B1 facing vertically upward, and a user performs a working operation by pressing a workpiece onto the sanding belt B while holding the workpiece. The second lock switch 95 is mainly used in the second use mode.

<The Structure of the First Switch>

Figure 13:
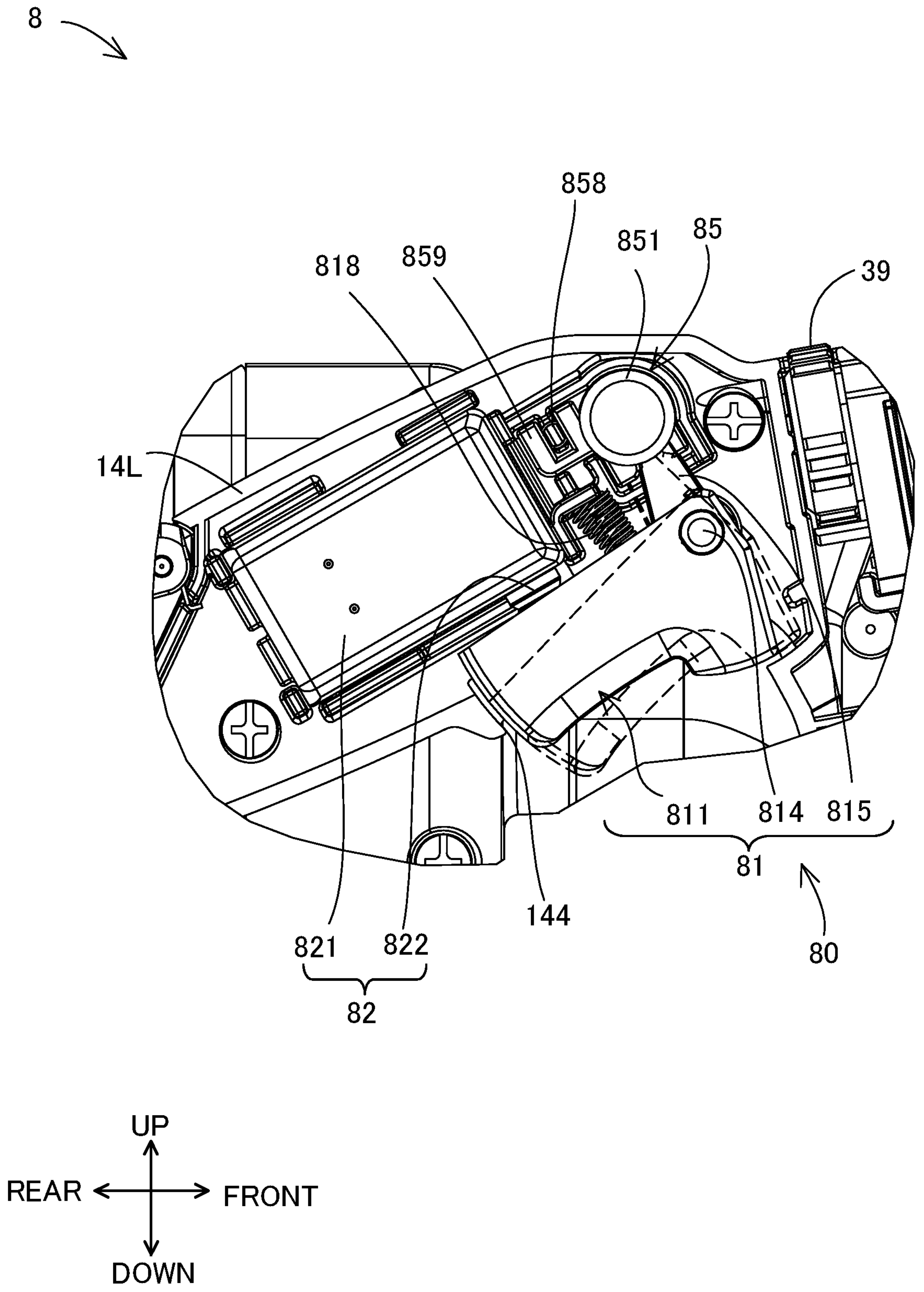
FIG. 13 is a right side view, with a right body housing removed, showing a first switch and a first lock switch in enlarged view.

First, the structure of the first switch 80 is described. As shown in FIGS. 12 and 13, the first switch 80 has a first switch operation part 81 and a first main switch 82.

The first main switch 82 is held within the handle 14 of the body housing 11. The first main switch 82 has a body 821 that is electrically connected to the controller 5, and a plunger 822 that is exposed from a lower part of the body 821 and configured to be movable substantially in the up-down direction.

The first main switch 82 is turned on (placed in an ON state) when the length of the exposed part of the plunger 822 is a prescribed threshold or less, and turned off (placed in an OFF state) when the length of the exposed part of the plunger 822 exceeds the prescribed threshold. The body 821 outputs an ON signal to the controller 5 when the first main switch 82 is ON.

The first switch operation part 81 is configured to be manually operated by a user. The first switch operation part 81 can be moved to a first ON position and a first OFF position. In FIG. 13, the first switch operation part 81 placed in the first ON position is shown by solid lines, and the first switch operation part 81 placed in the first OFF position is shown by broken lines. The first ON position is a position of the first switch operation part 81 where the first switch operation part 81 acts on the first main switch 82 to place the first main switch 82 in the ON state. The first OFF position is a position of the first switch operation part 81 to place the first main switch 82 in the OFF state. The first switch operation part 81 is normally in the first OFF position. Operations of moving the first switch operation part 81 to the first ON position and the first OFF position are also referred to as an ON operation and an OFF operation, respectively. In this embodiment, the ON operation of the first switch operation part 81 is depressing it, and the OFF operation of the first switch operation part 81 is releasing the depressing operation.

Figure 14:
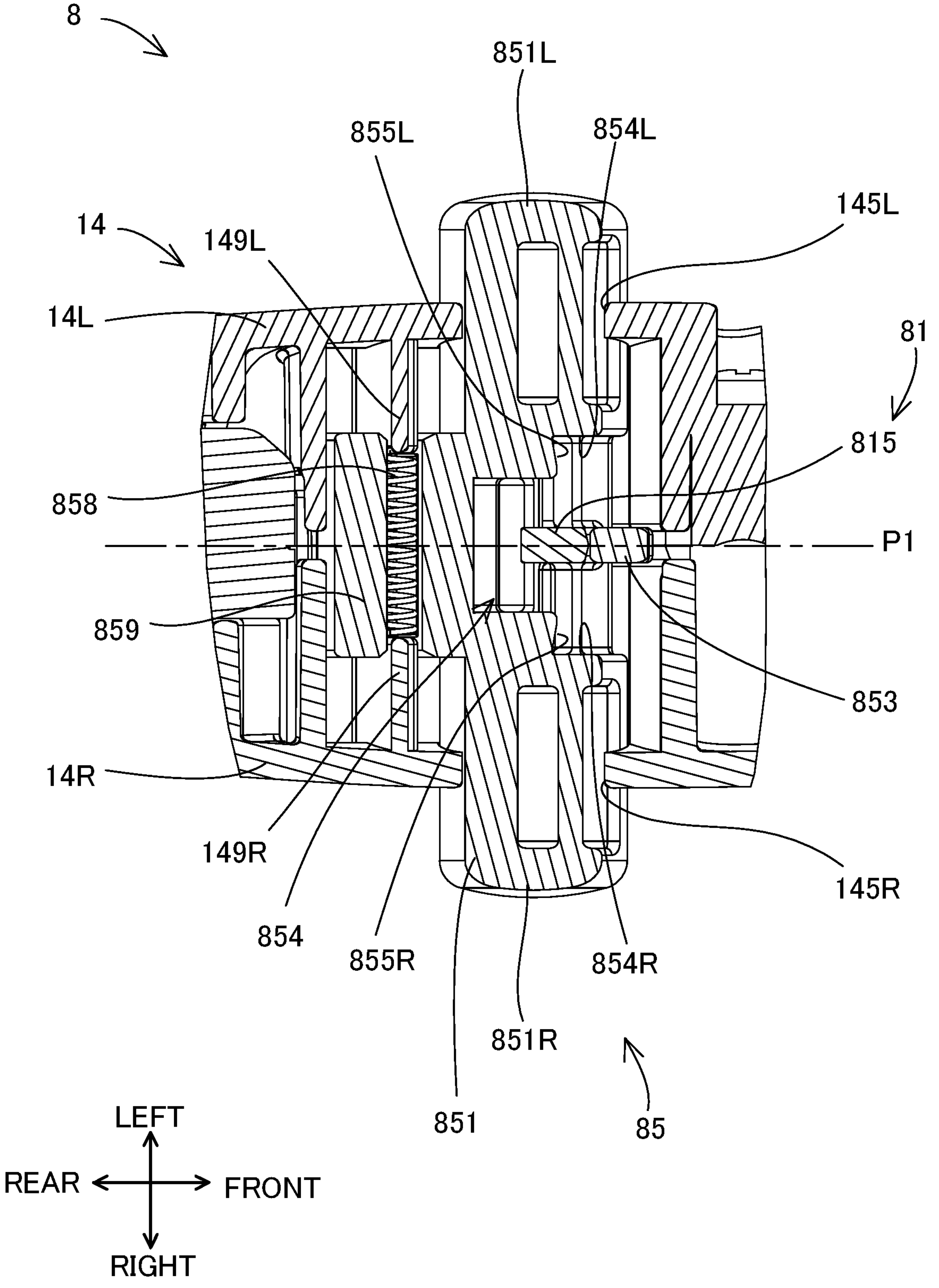
FIG. 14 is a sectional view taken along line XIV-XIV in FIG. 12, showing a first lock switch and a first switch operation part in a lock-off state.
Figure 15:
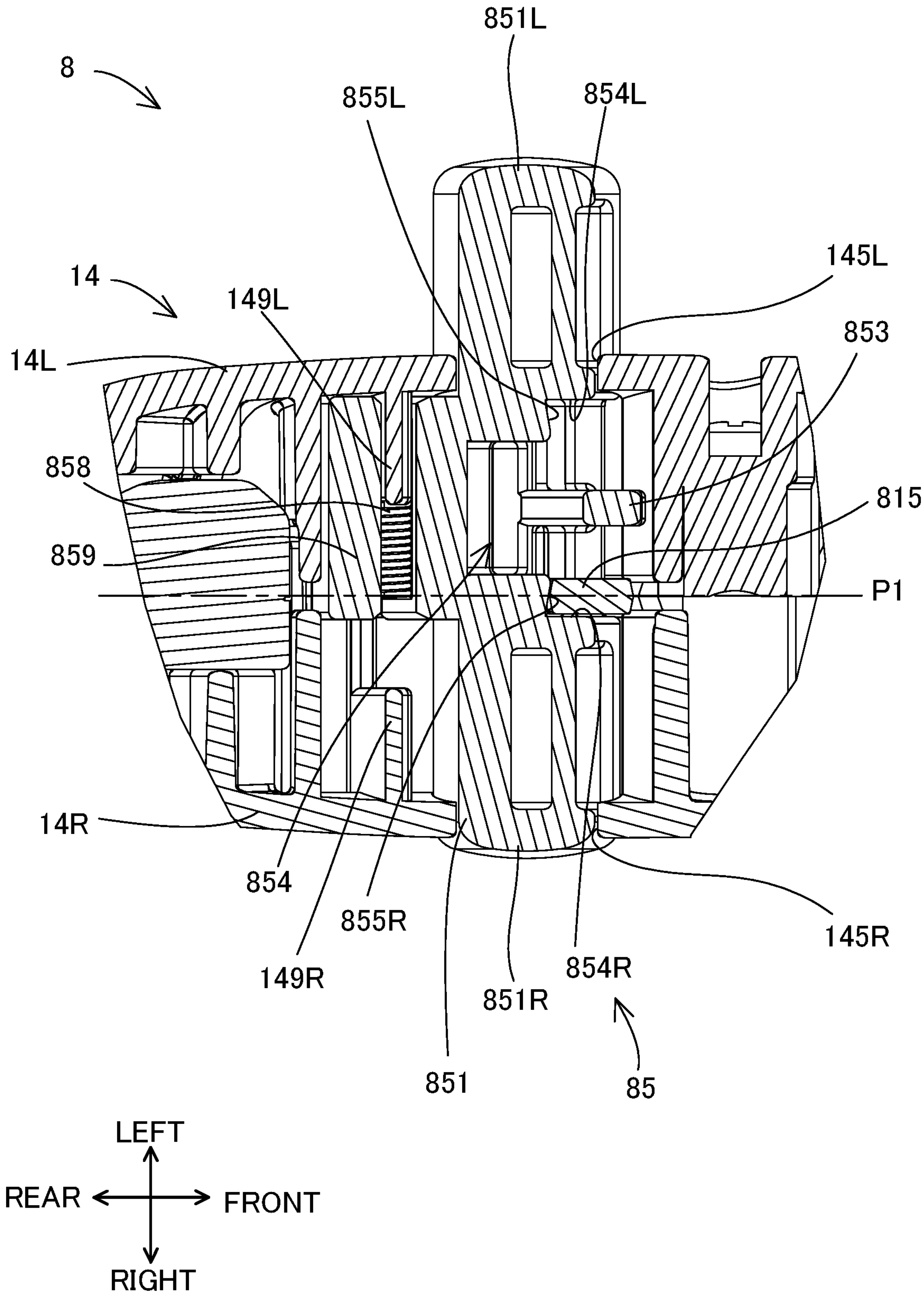
FIG. 15 is a sectional view corresponding to FIG. 14, with the first lock switch placed in a first lock-on position.
Figure 16:
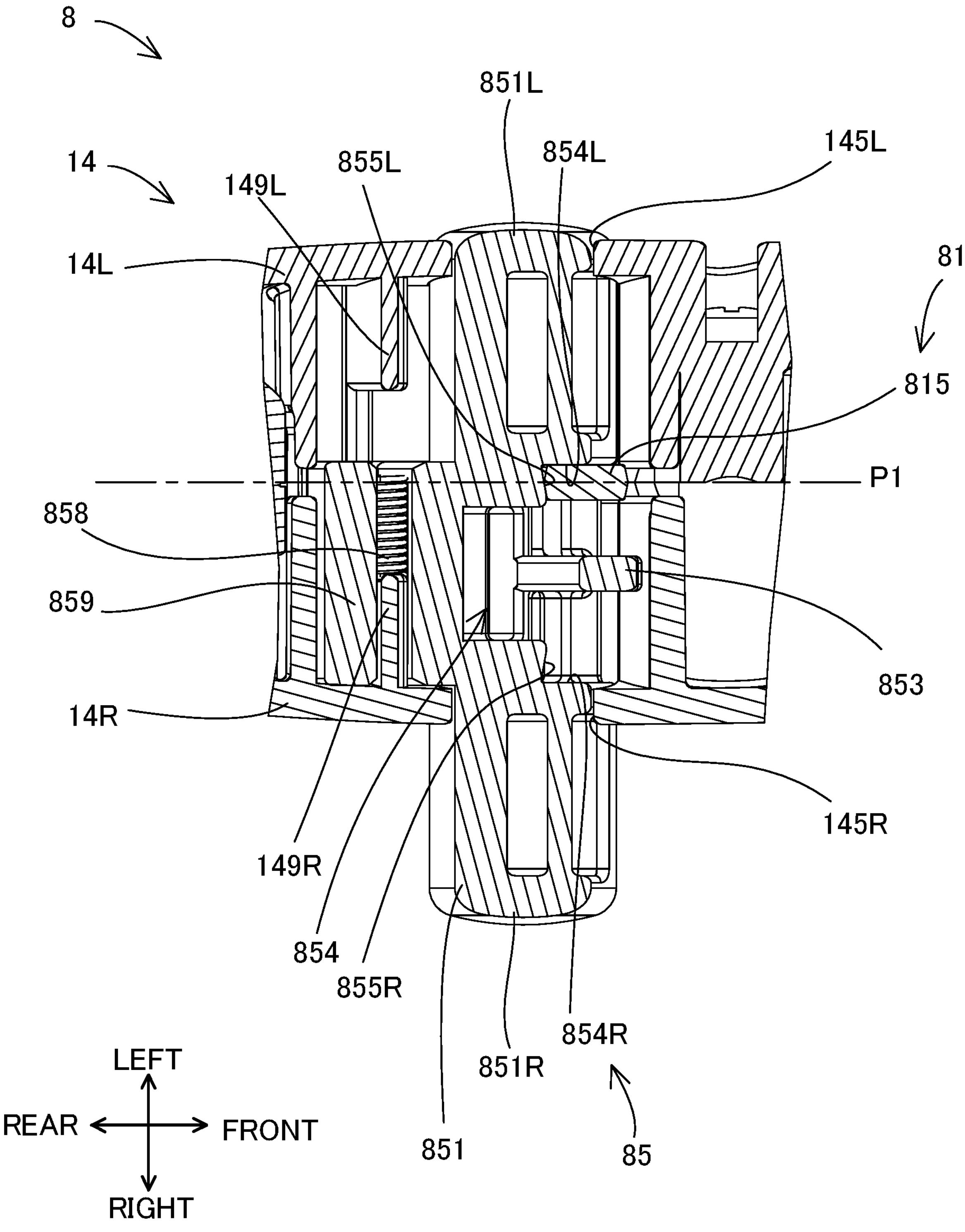
FIG. 16 is a sectional view corresponding to FIG. 14, with the first lock switch placed in a second lock-on position.

The structure of the first switch operation part 81 is now specifically described. The first switch operation part 81 has a base 811, a boss 814 and a projection 815. The base 811 extends from front of the first main switch 82 to below the plunger 822. Part of the base 811 protrudes downward from the opening 144 formed in the front lower part of the handle 14. This protruding part has an external shape that conforms to user's fingers. The base 811 has an abutment part 812 (see FIG. 12) that abuts on a lower end of the plunger 822. The projection 815 has a generally thick plate-like shape protruding upward from a front part of the base 811. As shown in FIGS. 14 to 16, the projection 815 is located substantially in the center of the handle 14 in the left-right direction, and the plane P1 passes through the projection 815 (through this center). The boss 814 extends in the left-right direction in a front part of the base 811 and is supported by the handle 14. The boss 814 is rotatable relative to the handle 14.

When the ON operation of the first switch operation part 81 is not restricted by the first lock switch 85, the first switch operation part 81 is depressed into the opening 144 by user's depressing operation. At this time, the first switch operation part 81 is turned clockwise around the boss 814. Thus, the first switch operation part 81 is moved from a position shown by the broken lines to a position shown by the solid lines in FIG. 13, and the projection 815 is moved forward. Further, the abutment part 812 pushes in the plunger 822. When the abutment part 812 pushes in the plunger 822, the first main switch 82 (the first switch 80) is placed in the ON state. The first ON position is also a position of the first switch operation part 81 where the length of the exposed part of the plunger 822 is the prescribed threshold or less.

When the depressing operation of the first switch operation part 81 is released, the first switch operation part 81 is turned counterclockwise around the boss 814 and returned to an initial position, and the projection 815 is moved rearward. Further, the abutment part 812 releases pushing of the plunger 822. Thus, the first switch 80 is placed in the OFF state. The first OFF position is also a position of the first switch operation part 81 where the length of the exposed part of the plunger 822 exceeds the prescribed threshold.

The first switch 80 further has a biasing member 818 configured to bias the first switch operation part 81 to the first OFF position. In this embodiment, a compression coil spring is used as the biasing member 818. As shown in FIG. 12, one end of the biasing member 818 is supported behind the boss 814 and in front of the abutment part 812 by the base 811. The other end of the biasing member 818 is supported by an inner wall of the handle 14. When the first switch operation part 81 is depressed against the biasing force of the biasing member 818 and placed in the first ON position, the first switch 80 is placed in the ON state. When the depressing operation of the first switch operation part 81 is released, the first operation part 81 is returned to the first OFF position by the biasing force of the biasing member 818, and thus the first switch 80 is placed in the OFF state.

<The Structure of the First Lock Switch>

The structure of the first lock switch 85 is now described. The first lock switch 85 is configured to be moved between a lock-off position for restricting the ON operation of the first operation part 81 and a lock-off release position for allowing the ON operation of the first operation part 81, by user's manual operation. The lock-off release position includes a lock-on position for maintaining the ON operation of the first switch 80. The first lock switch 85 is normally placed in the lock-off position. FIGS. 12 and 14 show the first lock switch 85 placed in the lock-off position (the lock-off state), and FIGS. 15 and 16 show the first lock switch 85 placed in the lock-on position (in the lock-on state).

As shown in FIG. 14, the first lock switch 85 has an operation stem 851, a lock-off locking part 853, lock-on locking parts 855L, 855R and a biasing member 858. The first lock switch 85 is configured as a push-in operation part to be pushed in relative to the handle 14 by a user.

The operation stem 851 extends substantially in the left-right direction. In the lock-off state, as shown in FIG. 14, a substantially central part of the operation stem 851 in the left-right direction is located on the plane P1. Left and right end parts of the operation stem 851 normally protrude from openings 145L, 145R formed in a left surface (a left wall 14L) and a right surface (a right wall 14R) of the handle 14, respectively. The left and right end parts of the operation stem 851 serve as operation parts 851L, 8518, respectively. The first lock switch 85 is arranged within the reach of a hand of a user operating the first switch operation part 81. Specifically, the operation part 851R is arranged within the reach of the right thumb of a user holding the handle 14 with the right hand such that the user can depress the first switch operation part 81 with a right finger. Further, the operation part 851L is arranged within the reach of the left thumb of a user holding the handle 14 with the left hand such that the user can depress the first switch operation part 81 with a left finger.

The lock-off locking part 853 is configured to abut on the projection 815 of the first switch operation part 81 and thus restrict a depressing operation of the first switch operation part 81. In this embodiment, a recess 854 is formed in a central part of the operation stem 851 in the left-right direction and recessed rearward. The lock-off locking part 853 has a thick plate-like shape protruding forward and downward from a central front part of the recess 854.

The lock-on locking parts 855L, 855R are respectively formed on left and right ends of the recess 854 and apart from the lock-off locking part 853. The lock-on locking parts 855L, 855R are located behind the lock-off locking part 853 in the front-rear direction. The lock-on locking parts 855L, 855R each have a thick plate-like shape protruding downward. The distance between the lock-on locking part 855L and the lock-off locking part 853 and the distance between the lock-on locking part 855R and the lock-off locking part 853 in the left-right direction are each larger than the thickness of the projection 815 in the left-right direction. Therefore, the projection 815 (the first switch operation part 81) is allowed to turn (into the lock-off release state) when disengaged from the lock-off locking part 853. At this time, the first switch operation part 81 is allowed to turn until a rear wall (rear side) of the projection 815 reaches a position in front of front walls (front sides) of the lock-on locking parts 855L, 855R in the front-rear direction.

The operation stem 851 further has restriction walls 854L, 854R. The restriction walls 854L, 854R define the left and right ends of the recess 854. The restriction wall 854L is formed on the left front side of the lock-on locking part 855L. The restriction wall 854L abuts on the left surface of the projection 815 when the first lock switch 85 is pushed to the right. Thus, the restriction wall 854L restricts rightward movement of the first lock switch 85 and positions the lock-on locking part 855L directly behind the projection 815. The restriction wall 854R is formed on the right front side of the lock-on locking part 855R The restriction wall 854R abuts on the right surface of the projection 815 when the first lock switch 85 is pushed to the left. Thus, the restriction wall 854R restricts leftward movement of the first lock switch 85 and positions the lock-on locking part 855R directly behind the projection 815.

The biasing member 858 is arranged behind the operation stem 851 so as to extend in the left-right direction. The biasing member 858 is configured to bias the first lock switch 85 to the lock-off position. In this embodiment, a compression coil spring is used as the biasing member 858.

In this embodiment, a holding part 859 is integrally formed with the operation stem 851 on the rear of the operation stem 851 so as to hold the biasing member 858. Left and right walls of the holding part 859 hold left and right ends of the biasing member 858, respectively. The left and right walls of the holding part 859 each have an opening. Projections 149L, 149R protruding from left and right walls of the handle 14 abut on the left and right ends of the biasing member 858 through the openings of the holding part 859, respectively. When the operation stem 851 is moved to the left, as shown in FIG. 15, the biasing member 858 moves to the left together with the holding part 859. At this time, the biasing member 858 is contracted with the right end of the biasing member 858 being supported by the right wall of the holding part 859 and with the left end of the biasing member 858 being supported by the projection 149L. When the operation stem 851 is moved to the right, as shown in FIG. 16, the biasing member 858 moves to the right together with the holding part 859. At this time, the biasing member 858 is contracted with the left end of the biasing member 858 being supported by the left wall of the holding part 859 and with the right end of the biasing member 858 being supported by the projection 149R.

As described above, the first lock switch 85 is normally placed in the lock-off position. As shown in FIG. 14, the lock-off position is a position of the first lock switch 85 where the lock-off locking part 853 is located directly behind the projection 815. In the lock-off position, the lock-off locking part 853 is located on the plane P1. The first lock switch 85 can be moved to a first lock-on position shown in FIG. 15 when pushed to the right by user's manual operation. The first lock-on position is a position of the first lock switch 85 where the lock-on locking part 855R is located directly behind the projection 815. In the first lock-on position, the lock-on locking part 855R is located on the plane P1. Further, the first lock switch 85 can be moved to a second lock-on position shown in FIG. 16 when pushed to the left by user's manual operation. The second lock-on position is a position of the first lock switch 85 where the lock-on locking part 855L is located directly behind the projection 815. In the second lock-on position, the lock-on locking part 855 is located on the plane P1.

<Method of Operating the First Switch and the First Lock Switch>

As shown in FIGS. 12 and 14, when the first lock switch 85 is located in the lock-off position, a rear wall of the lock-off locking part 853 abuts on (engages or interferes with) a front wall of the projection 815 of the first switch operation part 81. Thus, the lock-off locking part 853 restricts forward movement of the projection 815 or the depressing operation of the first switch operation part 81 (in the lock-off state).

When the user pushes the operation part 851R into the handle 14, the first lock switch 85 is moved to the left from the lock-off position. Thus, the lock-off locking part 853 is disengaged from the projection 815 of the first switch operation part 81 (in the lock-off release state). Therefore, the projection 815 is allowed to turn clockwise, so that the depressing operation (ON operation) of the first switch operation part 81 is allowed. Further, when the user depresses the first switch operation part 81, the projection 815 can be turned clockwise to be moved forward of the lock-on locking part 855R in the front-rear direction.

When the user further pushes the first lock switch 85 to the left, as shown in FIG. 15, the first lock switch 85 moves to the left until the restriction wall 854R abuts on the right surface of the projection 815. The lock-on locking part 855R, which is formed on the left rear side of the restriction wall 854R, is located directly behind the projection 815 when the restriction wall 854R abuts on the right surface of the projection 815. Thus, the first lock switch 85 is placed in the first lock-on position.

When the user releases the depressing operation (ON operation) of the first switch operation part 81, the biasing member 818 (see FIG. 12) applies a biasing force to the first switch operation part 81 toward the first OFF position. At this time, however, the rear wall (rear side) of the projection 815 is engaged with the front wall (front side) of the lock-on locking part 855R and restricts movement of the first switch operation part 81 to the first OFF position. Thus, the first switch operation part 81 is kept in the first ON position. Therefore, the ON operation of the first switch operation part 81 is maintained (in the lock-on state) even if the user releases the depressing operation of the first switch operation part 81. At this time, the biasing member 858 of the first lock switch 85 is contracted as shown in FIG. 15 and biases the first lock switch 85 to the lock-off position. The biasing member 818 of the first switch 80 however biases the projection 815 of the first switch operation part 81 (the first switch operation part 81) toward the first OFF position (in a direction to turn the projection 815 counterclockwise). Therefore, the biasing force of the biasing member 818 is applied to the lock-on locking part 855R via the projection 815 so that the lock-on locking part 855R is kept engaged with the projection 815. Thus, the first lock switch 85 is kept in the first lock-on position.

In the state as shown in FIG. 15 where the first lock switch 85 is placed in the first lock-on position and the ON operation of the first switch operation part 81 is maintained, the projection 815 turns clockwise when the user further depresses the first switch operation part 81. The projection 815 is then separated and disengaged from the lock-on locking part 855R. Therefore, the first lock switch 85 is returned to the lock-off position by the biasing force of the biasing member 858 (see FIG. 14). Further, the first switch operation part 81 is returned to the first OFF position by the biasing force of the biasing member 818.

The user can also move the first lock switch 85 from the lock-off position to the second lock-on position in the same manner as described above. Specifically, when the user pushes the operation part 851L into the handle 14, the first lock switch 85 is moved to the right from the lock-off position. Thus, the lock-off locking part 853 is disengaged from the projection 815 of the first switch operation part 81. Further, when the user depresses (turns on) the first switch operation part 81, the projection 815 can be moved forward of the lock-on locking part 855L in the front-rear direction.

When the user further pushes the first lock switch 85 to the right, as shown in FIG. 16, the first lock switch 85 moves to the right until the restriction wall 854L abuts on the left surface of the projection 815. The lock-on locking part 855L, which is formed on the right rear side of the restriction wall 854L, is located directly behind the projection 815 when the restriction wall 854L abuts on the left surface of the projection 815. Thus, the first lock switch 85 is placed in the second lock-on position.

When the user releases the depressing operation (ON operation) of the first lock switch 85, the biasing member 818 applies a biasing force to the first switch operation part 81 toward the first OFF position. At this time, however, the rear wall of the projection 815 abuts on the front wall of the lock-on locking part 855L and restricts movement of the first switch operation part 81 to the first OFF position. Thus, the first switch operation part 81 is kept in the first ON position. Therefore, the ON operation of the first switch operation part 81 (the lock-on state of the first switch 80) is maintained (in the lock-on state of the first switch 80) even if the user releases the depressing operation of the first lock switch 85. At this time, the biasing force of the biasing member 818 is applied to the lock-on locking part 855L (the first lock switch 85) via the projection 815, so that the first lock switch 85 is kept in the second lock-on position.

In the state as shown in FIG. 16 where the first lock switch 85 is placed in the second lock-on position and the ON operation of the first switch operation part 81 is maintained, the projection 815 turns clockwise when the user further depresses the first switch operation part 81. Thus, the projection 815 is disengaged from the lock-on locking part 855R. Therefore, the first lock switch 85 is returned to the lock-off position by the biasing force of the biasing member 858 (see FIG. 14). Further, the first switch operation part 81 is returned to the first OFF position by the biasing force of the biasing member 818.

As described above, when the first switch 80 is in the lock-on state (see FIGS. 15 and 16), the user can place the first switch 80 in the OFF state and also place the first switch 80 in the lock-off state simply by depressing the first switch operation part 81 once and then releasing the depressing operation.

<The Structure of the Second Switch>

The structure of the second switch 90 is now described. As shown in FIG. 12, the second switch 90 has a second switch operation part 91 and a second main switch 92.

The second main switch 92 is held behind the first switch 80 within the handle 14 of the body housing 11. The second main switch 92 has a body 921 that is electrically connected to the controller 5, and an actuator 922 that protrudes upward from an upper part of the body 921. The actuator 922 is pushed into the body 921 when pressed downward. The second main switch 92 is turned on (placed in the ON state) when the amount of pushing (pressing) the actuator 922 into the body 921 is a prescribed threshold or more, and turned off (placed in the OFF state) when the amount of pushing (pressing) the actuator 922 into the body 921 is less than the prescribed threshold. The body 921 outputs an ON signal to the controller 5 when the second main switch 92 is ON.

Figure 17:
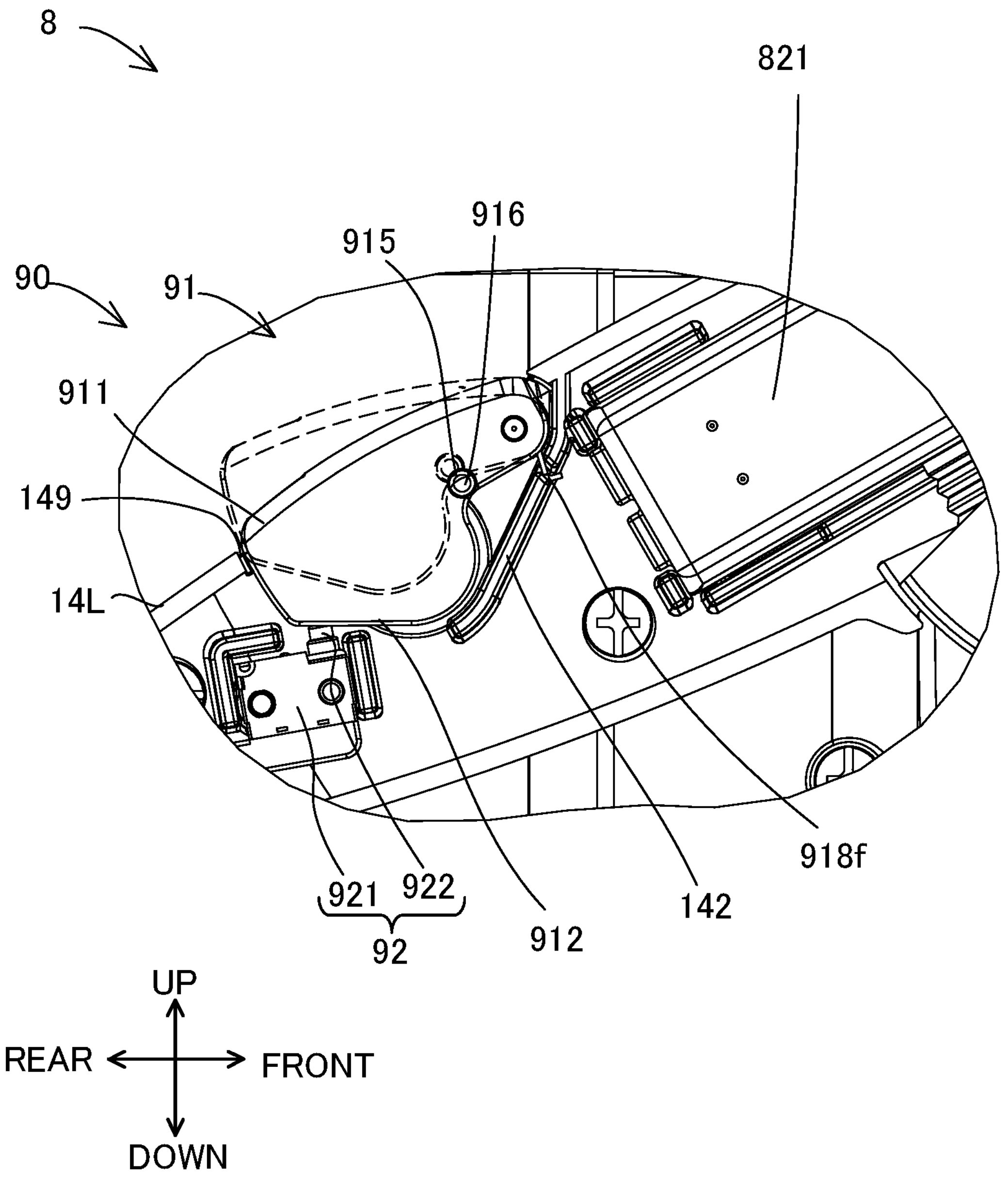
FIG. 17 is a right side view, with the right body housing removed, showing a second switch and a second lock switch in enlarged view.

The second switch operation part 91 is arranged behind the first switch operation part 81 and the first lock switch 85. The second switch operation part 91 is arranged below an imaginary plane P2 (see FIG. 6) including the upper wall 121 of the first part 12 (the motor housing part). As shown in FIG. 12, the second switch operation part 91 is arranged in the handle 14 such that part of the second switch operation part 91 protrudes upward from the opening 149 formed in the rear upper part of the handle 14, and is movable substantially in the up-down direction. The second switch operation part 91 is configured to be manually operated by a user. The second switch operation part 91 can be moved to a second ON position and a second OFF position. In FIG. 17, the second switch operation part 91 placed in the second ON position is shown by solid lines, and the second switch operation part 91 placed in the second OFF position is shown by broken lines. The second ON position is a position of the second switch operation part 91 where the second switch operation part 91 acts on the second main switch 92 to drive the motor 2.

The second OFF position is a position of the second switch operation part 91 to stop driving of the motor 2. The second switch operation part 91 is normally in the second OFF position. Operations of moving the second switch operation part 91 to the second ON position and the second OFF position are also referred to as an ON operation and an OFF operation, respectively. In this embodiment, the ON operation of the second switch operation part 91 is pushing it, and the OFF operation of the second switch operation part 91 is releasing the pushing operation.

The structure of the second switch operation part 91 is now specifically described. The second switch operation part 91 has a base 911, a pivot shaft (turning shaft) 916 extending in the left-right direction and having left and right ends supported by the handle 14, and a biasing member 918. The base 911 is arranged above and in front of the second main switch 92 and extends in the front-rear direction. The base 911 has a rear part projecting downward. An abutment part 912 is provided in a rear lower part of the base 911 and configured to abut on an upper end of the actuator 922.

Part of the base 911 normally protrudes upward from the opening 149 formed in the rear upper part of the handle 14 (see FIG. 12). This protruding part has a dorsal fin-like shape. A shaft hole 915 is formed in a front end part of the base 911 and extends in the left-right direction, and the pivot shaft 916 is inserted through the shaft hole 915. The base 911 is turnable around the pivot shaft 916. The base 911 is turned counterclockwise (downward) and pushed into the opening 149 by user's pushing operation.

The base 911 is formed in a block shape having a space inside. As shown in FIG. 12, an opening 917 is formed in a left wall 911L of the base 911. The position and size of the opening 917 are set such that a locking part 954 of the second lock switch 95 can be inserted into the inside space of the base 911, which will be described below in detail.

The biasing member 918 is configured to bias the second switch operation part 91 to the second OFF position. In this embodiment, a torsion spring is used as the biasing member 918. A coil part of the torsion spring 918 is fitted on the pivot shaft 916. A support wall 142 is formed to extend rearward and downward from the front of the base 911 within the handle 14, and one arm **918*f* of the torsion spring 918 is fixed to the support wall 142. The other arm (not shown) of the torsion spring 918 is fixed to the base 911 and biases the base 911** upward (in the clockwise direction).

The second switch operation part 91 is pushed into the opening 149 by user's pushing operation. At this time, the second switch operation part 91 is turned counterclockwise around the pivot shaft 916. Thus, the abutment part 912 moves downward and pushes in the actuator 922, so that the second main switch 92 (the second switch 90) is placed in the ON state. This second ON position is also a position of the second switch operation part 91 where the amount of pushing (pressing) the actuator 922 is a prescribed threshold or more.

When the pushing operation of the second switch operation part 91 is released, the second switch operation part 91 is turned clockwise around the pivot shaft 916 and returned to an initial position, so that the abutment part 912 releases pushing of the actuator 922. Thus, the second switch 90 is placed in the OFF state. The second OFF position is also a position of the second switch operation part 91 where the amount of pushing (pressing) the actuator 922 is less than the prescribed threshold.

<The Structure of the Second Lock Switch>

Figure 18:
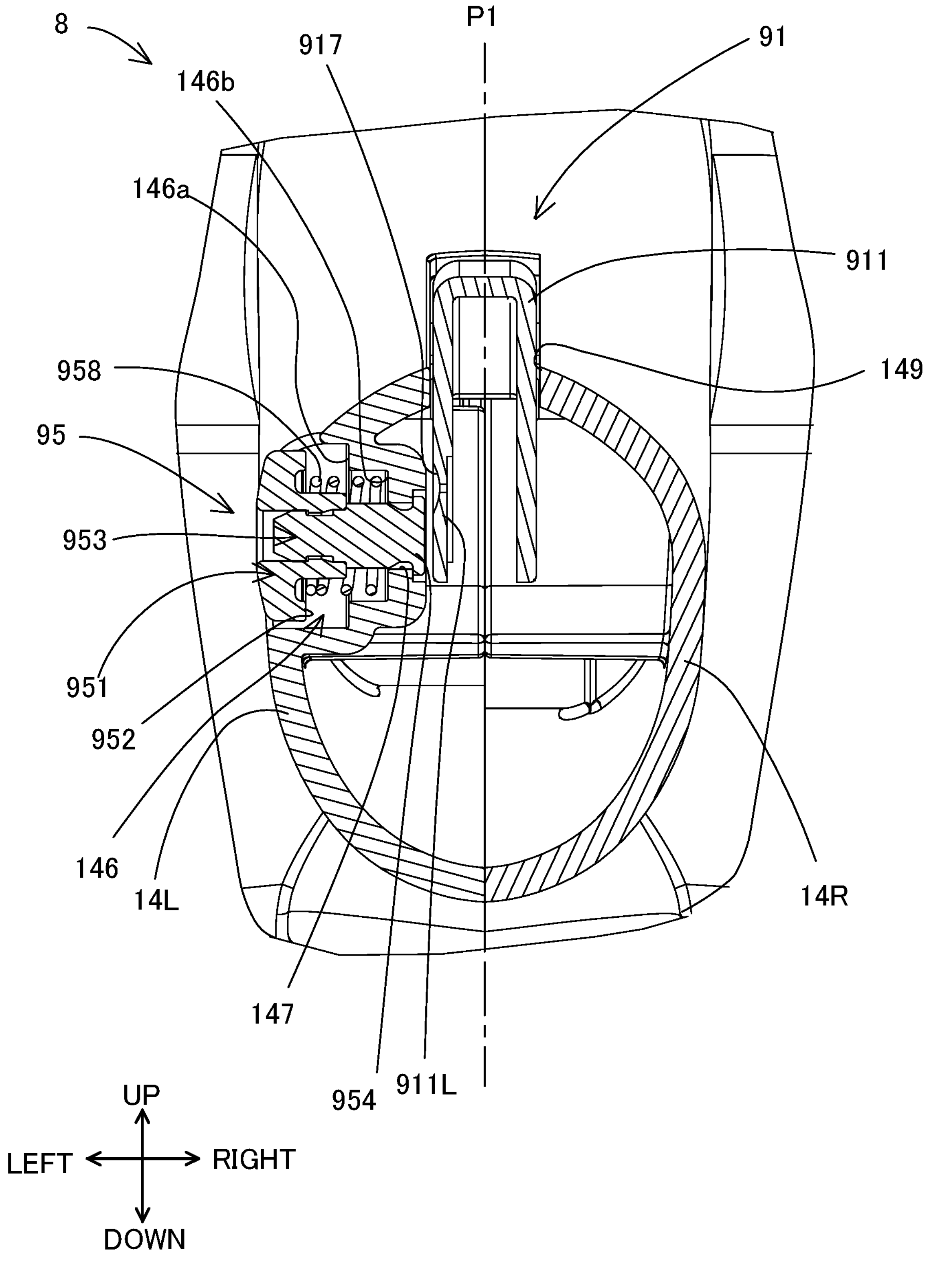
FIG. 18 is a sectional view taken along line XVIII-XVIII in FIG. 5, showing the second switch and the second lock switch.

The second lock switch 95 is provided in a rear part of the handle 14 and configured to act on the second switch 90. The second lock switch 95 is arranged behind the first lock switch 85 in the front-rear direction and below the first lock switch 85 in the up-down direction. As shown in FIG. 18, part of the second lock switch 95 is exposed from an opening 147 formed in the left wall 14L of the handle 14. The second lock switch 95 is normally placed in the OFF position (non-lock-on position) (see FIG. 18).

Figure 19:
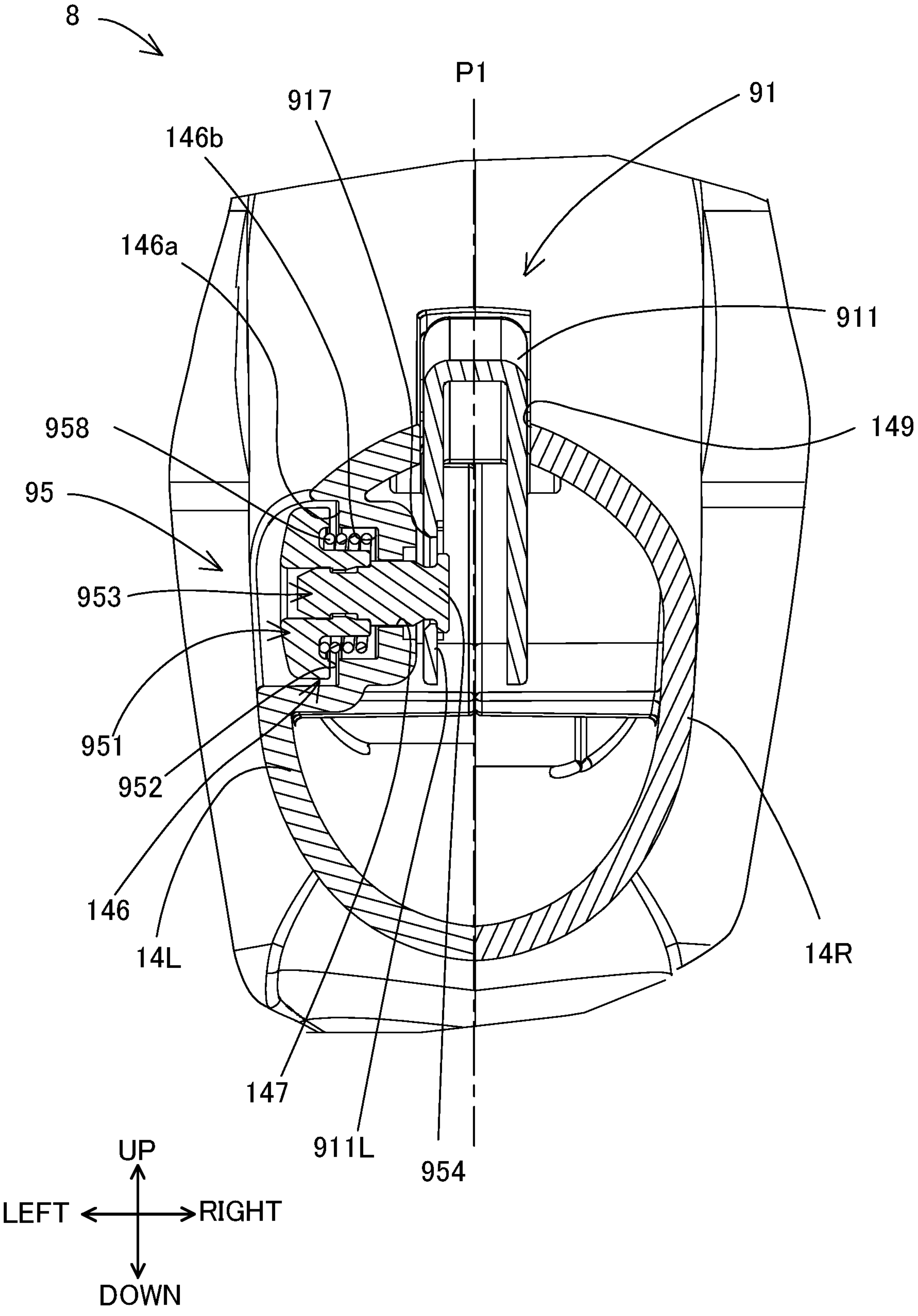
FIG. 19 is a sectional view corresponding to FIG. 18, with the second lock switch placed in a lock-on position.

The second lock switch 95 can be moved to a lock-on position for maintaining the ON operation of the second switch operation part 91 by user's manual operation (see FIG. 19).

A recess 146 is formed in a position corresponding to a rear part of the second switch operation part 91, in the left wall 14L of the handle 14 and recessed rightward as shown in FIGS. 18 and 19. The second lock switch 95 is arranged in the recess 146. The recess 146 has a multi-stepped circular shape having an inner diameter decreasing step by step to the right. The opening 147 is arranged substantially in the central part of the recess 146. The recess 146 has a first flange **146*a* and a second flange 146*b* that are orthogonal to the left-right direction. The second flange 146*b* is an annular wall formed around the opening 147. The first flange 146*a* is an annular wall formed on the left side of the second flange 146*b* and around the second flange 146*b***.

The second lock switch 95 has a stepped pin 953, an operation part 951 provided on a left end part of the stepped pin 953, and a biasing member 958.

The stepped pin 953 extends substantially in the left-right direction and is movable in the left-right direction. The stepped pin 953 is arranged in the handle 14 so as to be inserted into the opening 917 of the base 911 when the second switch operation part 91 is pushed. The stepped pin 953 is inserted through the opening 147 while a right end part of the stepped pin 953 is arranged within the handle 14 and a left end part of the stepped pin 953 is arranged within the recess 146 (on the left side of the opening 147). The outer diameter of the right end part of the stepped pin 953 is larger than the diameter of the opening 147, so that the stepped pin 953 is prevented from coming off from the handle 14. Further, the right end part of the stepped pin 953 serves as a locking part 954 that is configured to be locked to the second switch operation part 91 to keep the second switch operation part 91 in the second ON position, which will be described below in detail.

The operation part 951 has a cap-like shape to be fitted onto the left end part of the stepped pin 953. The operation part 951 can be moved in the left-right direction together with the stepped pin 953. The outer diameter of the operation part 951 is larger than that of the second flange 146*b* and smaller than that of the first flange 146*a*, so that the first flange 146*a* restricts rightward movement of the operation part 951. Unlike the first lock switch 85, the operation part 951 of the second lock switch 95 does not protrude leftward from the left wall 14L surrounding the recess 146 in the left-right direction.

The biasing member 958 is configured to bias the second lock first switch 95 to the non-lock-on position. In this embodiment, a compression coil spring is used as the biasing member 958. The biasing member 958 is fitted onto the stepped pin 953. A left end of the biasing member 958 is supported by a flange part 952 of the operation part 951 and a right end of the biasing member 958 is supported by the second flange 146*b*.

<Method of Operating the Second Switch and the Second Lock Switch>

As shown in FIGS. 12 and 18, part of the second switch operation part 91 (the base 911) protrudes upward from the handle 14 through the opening 149 formed in the handle 14 (in the second OFF position). As described above, the second switch operation part 91 is pushed into the opening 149 and moved to the second ON position by user's pushing operation, so that the second main switch 92 (the second switch 90) is placed in the ON state.

When the user pushes the operation part 951 of the second lock switch 95 into the handle 14 while pushing the second switch operation part 91, the locking part 954 of the second lock switch 95 is inserted into the inside space of the base 911 from the opening 917 formed in the base 911 of the second switch operation part 91. When the pushing operation of the second switch operation part 91 is released, the second switch operation part 91 is returned to the initial position (the second OFF position) by the biasing force of the torsion spring 918. Before the second switch operation part 91 is disengaged (moved) from the second ON position, however, the locking part 954 of the stepped pin 953 is engaged with the left wall 911L surrounding the opening 917 in the base 911 (see FIG. 19). Thus, the second switch operation part 91 is kept in the second ON position (in the lock-on state). Further, the second lock switch 95 is biased to the non-lock-on position by the biasing member 958, but kept in the lock-on position by engagement between the locking part 954 and the base 911. In this manner, the ON state of the second switch 90 is maintained even if the user releases the fingers from the second switch operation part 91 and the second lock switch 95.

In the above-described lock-on state, when the user pushes the second switch operation part 91, the second switch operation part 91 is turned counterclockwise (downward), so that the locking part 954 of the stepped pin 953 is disengaged from the left wall 911L of the base 911. Thus, the second lock switch 95 is returned to the non-lock-off position by the biasing force of the biasing member 958 (see FIG. 18). Further, the second switch operation part 91 is returned to the second OFF position by the biasing force of the biasing member 918. Thus, in the lock-on state, the user can place the second switch 90 in the OFF state simply by pushing the second switch operation part 91 once and then releasing the pushing operation.

The above-described switching mechanism 8 can be operated in the first and second use modes as follows. In the first use mode, the user pushes the second switch operation part 91, for example, with the left hand. Then, the user can release the lock-off state of the first switch 80 by pushing in the operation part 851R of the first lock switch 85 with the right thumb while putting the right hand on the first switch operation part 81. Further, the user can maintain the ON state of the first switch 80 (in the lock-on state) by depressing the first switch operation part 81 with the right hand and further pushing in the operation part 851R of the first lock switch 85 with the right thumb. In order to place the first switch 80 in the lock-on state, the user may also push the second switch operation part 91 with the right hand and push in the operation part 851L of the first lock switch 85 with the left thumb while putting the left hand on the first switch operation part 81. In this state, when the user releases the hand from the belt sander 1, the second switch operation part 91 is returned to the second OFF position and the second switch 90 is placed in the OFF state. Therefore, the user can stop the belt sander 1 simply by releasing the pushing operation of the second switch operation part 91.

In the second use mode, the user places the second switch 90 in the lock-on state by pushing the second switch operation part 91 (into the second ON position) and pushing in the second lock switch 95. Further, the user can place the first switch 80 in the lock-on state by operating the first switch operation part 81 and the first lock switch 85 in the same manner as in the first use mode. In this manner, the user can perform a working operation while releasing the hands from the belt sander 1 and holding a workpiece. As described above, the user can place the second switch 90 in the OFF state to stop the belt sander 1 simply by pushing the second switch operation part 91 once and then releasing the pushing operation.

As described above, in the belt sander 1 of this embodiment, the ON state of the first switch 80 can be maintained with the first lock switch 85 and the ON state of the second switch 90 can be maintained with the second lock switch 95. Therefore, in the second use mode, the belt sander 1 of this embodiment can stably continue to drive the motor 2 even if placed on a slightly uneven surface.

Further, in the lock-off state, the operation parts 851L, 851R of the second lock switch 85 protrude from the left and right walls 14L, 14R of the handle 14, respectively, and the operation part 951 of the second lock switch 95 is arranged in the recess 146 formed in the left wall 14L of the handle 14. This configuration facilitates continuous operations of the first and second lock switches 85, 95 in the second use mode. Therefore, in the second use mode, the maneuverability in driving the belt sander 1 is improved.

Further, in the belt sander 1, a part (the first part 12) of the housing 10 in which the motor 2 is housed has the upper wall 121 that is substantially parallel to the sanding belt B, and the second switch operation part 91 is arranged below the imaginary plane P2 including the upper wall 121. Thus, in the second use mode, the attitude of the belt sander 1 is stabilized by the upper wall 121 being placed on a desk or a stand.

The first lock switch 85 is configured to have a function (lock-off function) of preventing the first switch 80 from being placed in the ON state, as well as a function (lock-on function) of maintaining the ON state of the first switch 80. This can suppress complication of the switching mechanism and an increase in the size of the belt sander which may be caused by separately providing a switch having a lock-off function. Thus, according to this embodiment, the maneuverability in driving the belt sander 1 is improved, and the belt sander 1 can be more compact.

The second switch operation part 91 protrudes from the upper surface of the handle 14, so that the user can push in the second switch operation part 91 from above to place the second switch 90 in the ON state. Thus, in the first use mode, the maneuverability in driving the belt sander 1 is also improved.

Further, the second switch operation part 91 is returned to the second OFF position when the user releases the pushing operation of the second switch operation part 91. Thus, in the first use mode, the belt sander 1 is prevented from moving by itself even if the user releases the hand from the belt sander 1.

The second lock switch 95 is moved in the left-right direction crossing the moving direction (substantially the up-down direction) of the second switch operation part 91. Therefore, the second lock switch 95 is avoided from being unintentionally operated by being carelessly touched with the user's hand. In this embodiment, the second lock switch 95 is configured not to protrude outward from the handle 14 (to the left from the left wall 14L). Thus, the second lock switch 95 is further avoided from being unintentionally operated.

(Other Embodiments of the Switching Mechanism>

The first and second switches 80, 90 may have configurations other than those described above only if each configured as a momentary switch. For example, the first switch operation part 81 and the second switch operation part 91 may be each configured as a sliding operation part that is moved to the first or second ON position and the first or second OFF position by user's sliding operation. Likewise, the first lock switch 85 and the second lock switch 95 may have configurations other than those described above only if configured to maintain their respective ON operations of the first and second switches 80, 90.

In the above-described embodiment, a compression coil spring is used as the biasing members 818, 858, 958, and a torsion spring is used as the biasing member 918, but other biasing members (elastic bodies) may be used as the biasing members 818, 858, 918, 958.

In the above-described embodiment, the second lock switch 95 is provided on the left wall 14L of the handle 14, but it may be provided on the right wall 14R of the handle 14 or on the left and right walls 14L, 14R.

<The Structure of the Battery Mounting Part>

The structure of the battery mounting part 4 is now described with reference to FIGS. 1 to 5 and 20. The battery mounting part 4 is provided above the belt driving part 6 (on the second part 13 of the body housing 11). The battery mounting part 4 is configured such that a rechargeable battery 300 having a well-known structure can be mounted and removed to and from the battery mounting part 4 by being slid in a sliding direction relative to the battery mounting part 4.

Figure 20:
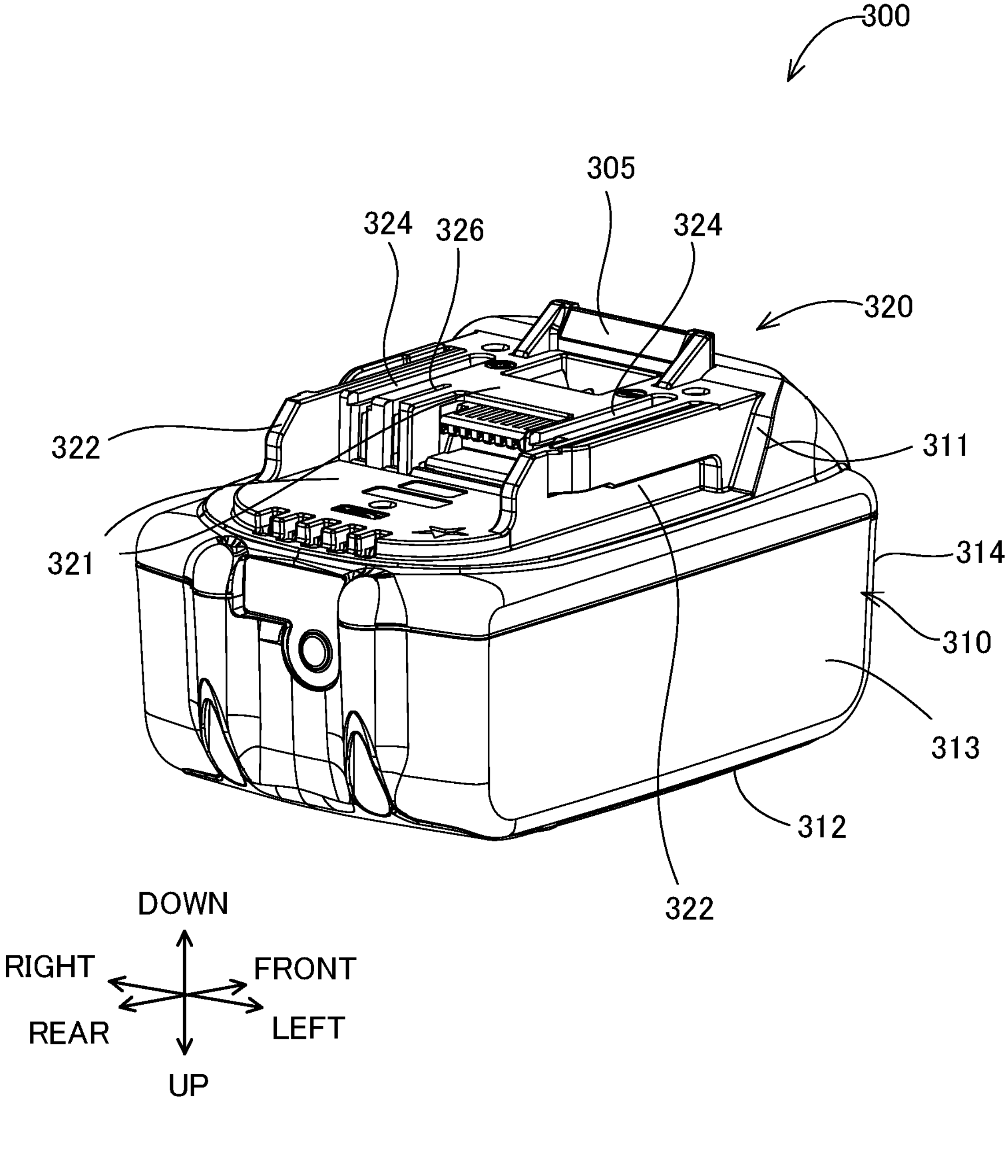
FIG. 20 shows an example of a battery that can be removably mounted to the belt sander.

One example of the battery that can be removably mounted to the battery mounting part 4 is first described. The battery 300 shown in FIG. 20 is an example of a battery pack to be mounted to the battery mounting part 4. In FIG. 20, the battery 300 has a case 310 for housing a plurality of battery cells, and a mounting part 320 configured to be removably mounted to the battery mounting part 4. The mounting part 320 has a mounting face 321 that faces a mounting face 41 of the battery mounting part 4 when the battery 300 is mounted to the battery mounting part 4. As for the directions of the battery 300 shown in FIG. 20, the side of the case 310 on which the mounting face 32 is provided is defined as a lower side and the opposite side is defined as an upper side. A direction crossing the up-down direction and corresponding to the sliding direction of the battery 300 is defined as a front-rear direction, and in the front-rear direction, the side on which a locking member 305 (described below) is provided is defined as a front side and the opposite side is defined as a rear side. Further, a direction crossing the up-down direction and the front-rear direction is defined as a left-right direction.

The mounting part 320 has the mounting face 321, a pair of rail receiving parts 322, a pair of power terminals 324 and a signal terminal 326. The mounting face 321 faces the mounting face 41 (described below in detail) of the battery mounting part 4 when the battery 300 is mounted to the battery mounting part 4 of the belt sander 1. In this embodiment, the mounting face 321 is a lower surface of the case 310 and includes a lower surface of a part (a protruding part 311) of a front lower part of the case 310 that protrudes downward. The mounting face 321 is substantially parallel to the front-rear direction and the left-right direction. The battery 300 has a rectangular box-like shape having a shorter length (width) in the up-down direction than the lengths (widths) in the front-rear direction and the left-right direction. The battery 300 (the case 310) has a long side in the sliding direction. A surface (an upper surface 312) of the battery 300 on the side opposite to the mounting face 321 has the largest area on the battery 300. The rail receiving parts 322 are respectively provided on left and right surfaces of the protruding part 311 and extend in the long-side direction of the case 310 (the front-rear direction). The rail receiving parts 322 are configured to be engaged with a pair of guide rails 42 (see FIG. 5) of the battery mounting part 4.

The mounting part 320 further has a locking member 305 provided in a front lower part of the protruding part 311. The locking member 305 is engaged with a lock receiving part of the battery mounting part 4 to lock the battery 300 to the battery mounting part 4. When an unlock button (not shown) is pushed by a user, the locking member 305 is disengaged or unlocked from the lock receiving part.

Figure 5:
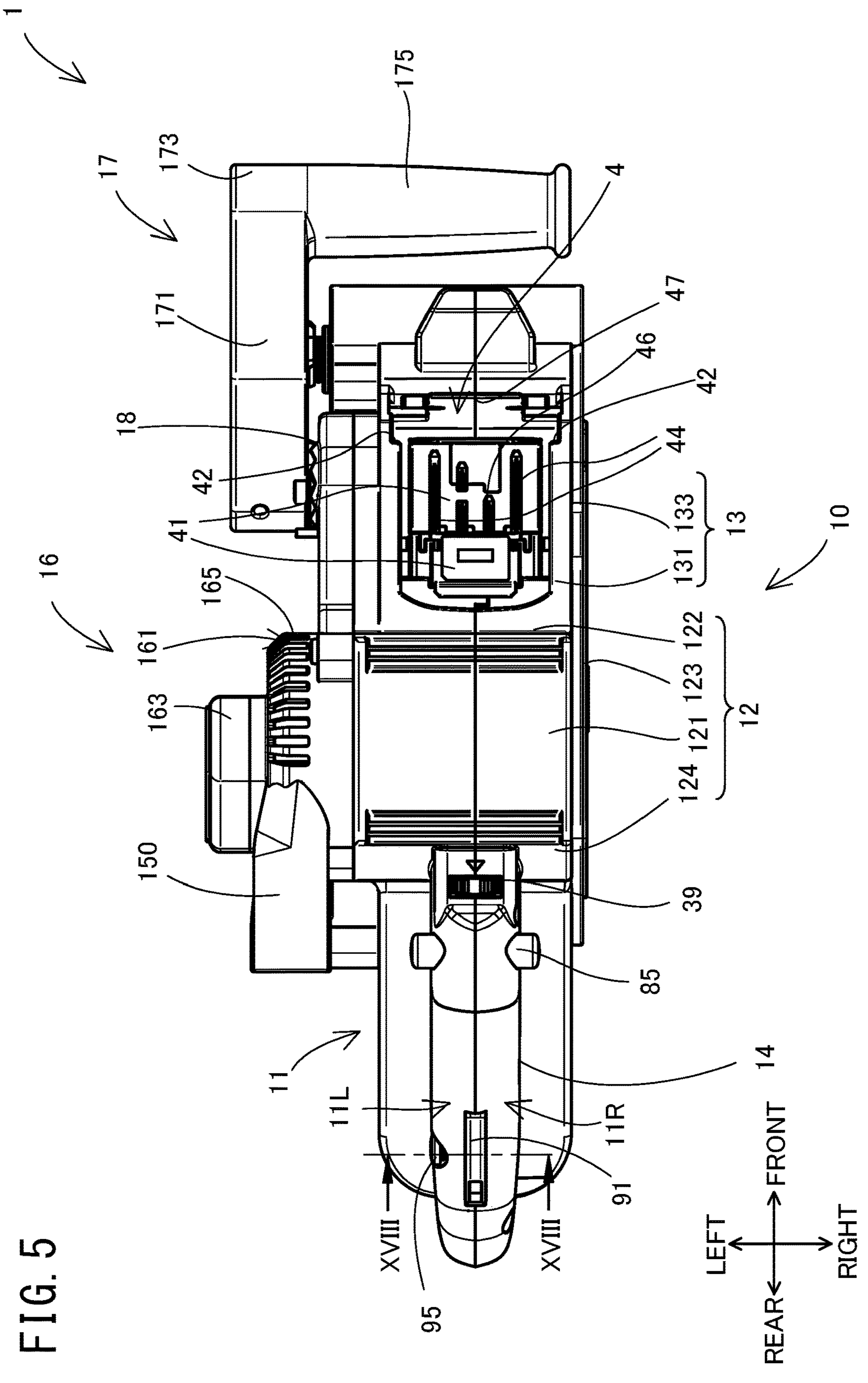
FIG. 5 is a top view of the belt sander.

As shown in FIGS. 2 and 5, the battery mounting part 4 is provided on the second part 13 of the body housing 11. The battery mounting part 4 is formed inside the upper wall 131 and the side walls 133 and configured such that the battery 300 can be mounted thereto from the front. As described above, a part of the body housing 11 that is located above the belt driving part 6 has a stepped shape in which the upper wall 131 of the second part 13 is located below the upper wall 121 of the first part 12. It can also be said that the battery mounting part 4 is provided in front of the motor 2 and above the belt driving part 6 since the first part 12 houses the motor 2. Further, it can also be said that the battery mounting part 4 overlaps with the belt driving part 6 when viewed from above and overlaps with the motor 2 when viewed from the front.

As shown in FIG. 6, the battery mounting part 4 is configured such that the battery 300 mounted to the battery mounting part 4 (this state is hereinafter referred to as a battery mounted state) does not protrude upward from the upper wall 121 of the housing 10 in the up-down direction. Further, the battery mounting part 4 is configured such that the battery 300 does not protrude forward from a front end of the body housing 11 in the front-rear direction in the battery mounted state. In this embodiment, as shown in FIG. 6, the surface (the upper surface 312) of the battery 300 on the side opposite to the mounting face 321 is located substantially in the same position as the upper wall 121 of the first part 12 of the body housing 11 in the up-down direction. Further, a front surface 314 of the battery 300 is located substantially in the same position as the front end of the body housing 11 in the front-rear direction. Further, as shown in FIG. 4, the battery mounting part 4 is configured such that the battery 300 does not protrude leftward from a left end of the left body housing 11L and rightward from a right end of the right body housing 11R in the left-right direction. In other words, the battery mounting part 4 is configured such that the battery 300 is fitted within the width of the second part 13 of the boy housing 11 in the left-right direction in the battery mounted state. In this embodiment, a right surface 313 of the battery 300 is located substantially in the same position as the side walls 123, 133 of the right body housing 11R in the left-right direction.

The battery mounting part 4 has a mounting face 41, a pair of guide rails 42, a pair of power terminals 44 and a signal terminal 46. In this embodiment, the battery 300 is slid in the front-rear direction relative to the battery mounting part 4. Specifically, the battery 300 is mounted onto the battery mounting part 4 in a direction from the front to the rear, and the battery 300 is removed from the battery mounting part 4 in a direction from the rear to the front.

The mounting face 41 faces a surface (the mounting face 321) of the battery 300 when the battery 300 is mounted to the battery mounting part 4. The mounting face 41 is substantially parallel to the front-rear direction and the left-right direction. The guide rails 42 are respectively provided on the insides of the side walls 133 of the second part 13 and extend in the front-rear direction. The guide rails 42 are configured to be engaged with the rail receiving parts 322 of the battery 300. The guide rails 42 guide the rail receiving parts 322 in the front-rear direction when the mounting part 320 of the battery 300 is mounted to the battery mounting part 4. It can also be said that the mounting face 41 is substantially parallel to the sliding direction of the battery 300.

The power terminals 44 are provided between the guide rails 42. The power terminals 44 each have a plate-like shape protruding upward from the mounting face 41 and extending in the front-rear direction. The power terminals 44 are configured to receive power from the battery 300 mounted to the battery mounting part 4. The signal terminal 46 is provided between the power terminals 44, protrudes upward from the mounting face 41 and extends in the front-rear direction. The signal terminal 46 is configured to transmit and receive signals to and from the battery 300 mounted to the battery mounting part 4.

When the mounting part 320 of the battery 300 is slid onto the battery mounting part 4 from the front, the rail receiving parts 322 of the battery 300 are engaged with the guide rails 42 of the battery mounting part 4 and the battery 300 is mounted to the battery mounting part 4. At this time, the mounting face 41 of the battery mounting part 4 faces the mounting face 321 of the battery 300. Further, the power terminals 44 of the battery mounting part 4 are electrically connected to the power terminals 324 of the battery 300, respectively, and the signal terminal 46 of the battery mounting part 4 is electrically connected to the signal terminal 326 of the battery 300.

The battery mounting part 4 further includes a lock receiving hole 47 that is engaged with the locking member 305 of the battery 300. When the battery 300 is mounted to the battery mounting part 4, the locking member 305 is engaged with the lock receiving hole 47, and the battery 300 is locked to be immovable in the front-rear direction. When the unlock button of the battery 300 is pushed down in this locked state, the locking member 305 is disengaged or unlocked from the lock receiving hole 47. In the disengaged state, the battery 300 is removed from the battery mounting part 4 when slid forward relative to the battery mounting part 4.

The belt sander 1 of this embodiment further has a front handle 17. The front handle 17 is connected to the housing 10 so as to be turnable relative to the housing 10. As shown in FIG. 3, a pivot axis A4 of the front handle 17 extends in the left-right direction. The front handle 17 is also referred to as a "second handle".

The front handle 17 turns around the pivot axis A4 extending in the left-right direction. The front handle 17 has an arm 171 having a proximal end part 172 and a distal end part 173 and extending in a direction crossing the pivot axis A4, and a grip part 175 configured to be held by a user.

As shown in FIGS. 4 and 5, the proximal end part 172 of the arm 171 is removably mounted to a turning part 18 provided on a left wall (the fan housing 161) of the housing 10. The turning part 18 is configured to be engaged with the proximal end part 172 of the arm 171 so as to allow the arm 171 to turn within a prescribed range around the pivot axis A4. The grip part 175 extends rightward from the distal end part 173 of the arm 171. The grip part 175 is parallel to the left-right direction. A distal end (right end) of the grip part 175 is located on the left side of a right end (the right walls 123, 133) of the housing 10. The length of the grip part 175 in the left-right direction is set such that the grip part 175 is fitted within the width of the housing 10 in the left-right direction. The length of the arm 171 of the front handle 17 and the position of the proximal end part 172 of the arm 171 on the housing 10 are adjusted to prevent the grip part 175 from coming into contact with the housing 10 and the battery 300 mounted to the battery mounting part 4 when the front handle 17 is turned.

A plurality of radially extending cam faces are formed on the turning part 18 and a part (a right surface of the proximal end part 172 of the grip part 175) of the front handle 17 that faces the turning part 18. The front handle 17 is configured to be positioned at a plurality of turning positions by engagement between the cam faces of the front handle 17 and the cam faces of the turning part 18. In this embodiment, the front handle 17 can be positioned at four turning positions (angular positions). As shown in FIG. 3, by turning of the arm 171 around the pivot axis A4, the front handle 17 (the grip part 175) is moved to positions R1, R2, R3 and R4 in order from the lower position to the upper position. The grip part 175 is fixedly positioned in the position R1, R2, R3 or R4 by engagement between the proximal end part 172 of the arm 171 and the turning part 18.

In the position R1, the grip part 175 is located in front of the front end of the housing 10 (the second part 13) and below the mounting face 41. In the position R2, the grip part 175 is located in front of the front end of the housing 10 and directly in front of the battery 300 mounted to the battery mounting part 4. In this embodiment, in the position R2, as shown in FIG. 6, an upper end of the grip part 175 is located substantially in the same position in the up-down direction as an upper end part of the housing 10 (the upper wall 121 of the first part 12) and the upper surface 312 of the battery 300 mounted to the battery mounting part 4. In the position R2, the plane P2 including the upper wall 121 passes the upper end of the grip part 175 and the upper surface 312 of the battery 300. The position R2 is also referred to as a "first turning position".

In the positions R3 and R4, the grip part 175 is located behind the front end of the housing 10 and above the upper wall 121 of the housing 10 in the up-down direction. The position R3 is a position suitable for a user to perform a working operation in the first use mode while holding the handle 14 with one hand and holding the front handle 17 with the other hand. The position R4 is a position suitable for a user to cany the belt sander 1 (while holding the handle 14 with one hand and holding the front handle 17 with the other hand). In the position R1, the grip part 175 is located below the mounting face 41, and in the positions R3 and R4, the grip part 175 is located above the upper end part of the housing 10 (the upper wall 121 of the first part 12), that is, above the battery 300 mounted to the battery mounting part 4. Thus, the user can turn the front handle 17 to move the grip part 175 to the position R1, R3 or R4 and mount and remove the battery 300 to and from the battery mounting part 4. The positions R1, R3 and R4 are also each referred to as a "second turning position".

Effects of the belt sander 1 having the battery mounting part 4 of this embodiment are now described. The battery mounting part 4 of this embodiment is arranged in a position to overlap with the belt driving part 6 (the sanding belt B, the sanding surface B1) when viewed from above and to overlap with the motor 2 when viewed from the front. Therefore, the weights of the motor 2 and the battery 300 mounted to the battery mounting part 4 are applied to the sanding surface B1 during driving of the belt sander 1. Thus, the working operation can be performed by utilizing the masses of the motor 2 and the battery 300, so that the operational efficiency of the belt sander 1 is improved.

Further, the battery mounting part 4 is configured such that the upper surface 312 of the battery 300 is located substantially in the same position as the upper wall 121 of the first part 12 of the body housing 11 in the up-down direction in the battery mounted state. Further, the right surface 313 of the battery 300 is located substantially in the same position as the side walls 123, 133 of the right body housing 11R in the left-right direction. Furthermore, the front surface 314 of the battery 300 is located substantially in the same position as the front end of the body housing 11 in the front-rear direction. With this configuration, the belt sander 1 can be more compact in the up-down direction, the left-right direction and the front-rear direction in the battery mounted state, and the possibility that the working range of the belt sander 1 is restricted by contact of the battery 300 with a structure such as a wall located in front or on the right or left of the belt sander 1 is reduced.

Further, when the user uses the belt sander 1 in the mode (the second use mode) in which the belt sander 1 is set upside down with the sanding surface B1 facing vertically upward and a user performs a working operation by pressing a workpiece onto the sanding belt B while holding the workpiece, the upper wall 121 of the housing 10 and the upper surface 312 of the battery 300 are placed in contact with a desk or the like since the upper surface 312 of the battery 300 is located substantially in the same position as the upper wall 121 of the housing 10 in the up-down direction in the battery mounted state. Therefore, the attitude of the belt sander 1 in the second use mode is stabilized. Further, the upper surface 312 of the battery 300 has the largest area on the battery 300, so that the contact area with the desk or the like is relatively large. Thus, the attitude of the belt sander 1 in the second use mode is more stabilized.

The battery 300 is mounted to the battery mounting part 4 of the belt sander 1 along the extending direction of the handle 14 in a direction from the front to the rear. Therefore, for example, when mounting the battery 300 to the battery mounting part 4, the user can easily apply a force in a direction (from the rear to the front) opposite to the mounting direction of the battery 300 with the hand holding the handle 14. Thus, the belt sander 1 of this embodiment provides the advantage that the battery 300 can be easily mounted to the battery mounting part 4.

Further, the belt sander 1 has the front handle 17 that is turnable relative to the housing 10. By turning the front handle 17, the grip part 175 is moved to the position R1 (the second turning position) in which the grip part 175 is located below the battery 300 mounted to the battery mounting part 4 in the up-down direction, the position R2 (the first turning position) in which the upper end of the grip part 175 is located substantially in the same position as the upper wall 121 of the housing 10, and the positions R3 and R4 (the second turning position) in which the grip part 175 is located above the battery 300 mounted to the battery mounting part 4. Therefore, when the front handle 17 is turned such that the grip part 175 is moved to the position R2 and the belt sander 1 is used in the second use mode, the upper wall 21 of the housing 10, the grip part 175 and the upper surface 312 of the battery 300 mounted to the battery mounting part 4 are placed in contact with a desk or the like on which the belt sander 1 is placed. Thus, the attitude of the belt sander 1 in the second use mode is further stabilized. Further, the battery 300 can be mounted to and removed from the battery mounting part 4 by turning the front handle 17 to move the grip part 175 to the position R1, R3 or R4.

Second Embodiment

Figure 21:
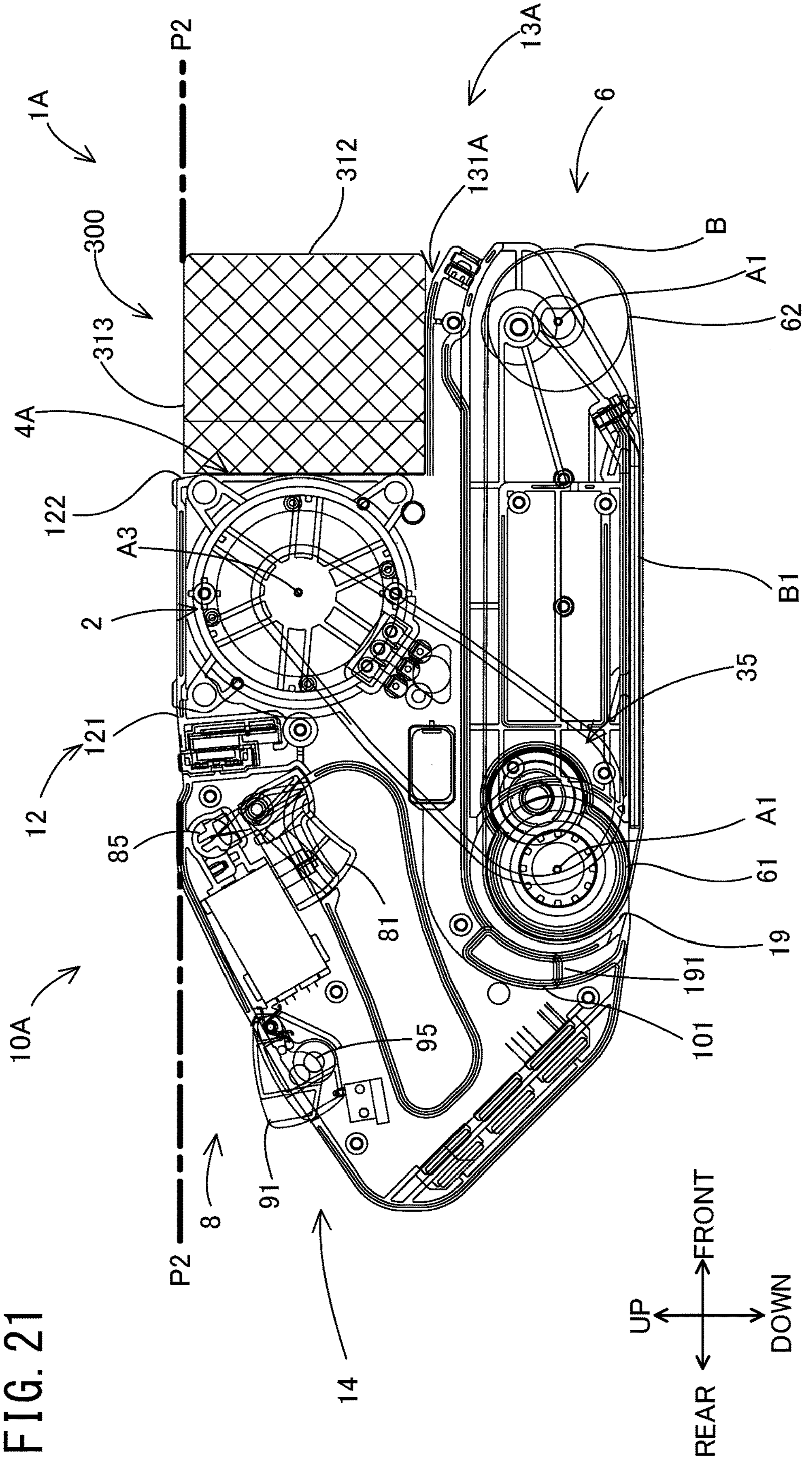
FIG. 21 is a right side view of a belt sander according to a second embodiment, with a right body housing removed.
Figure 22:
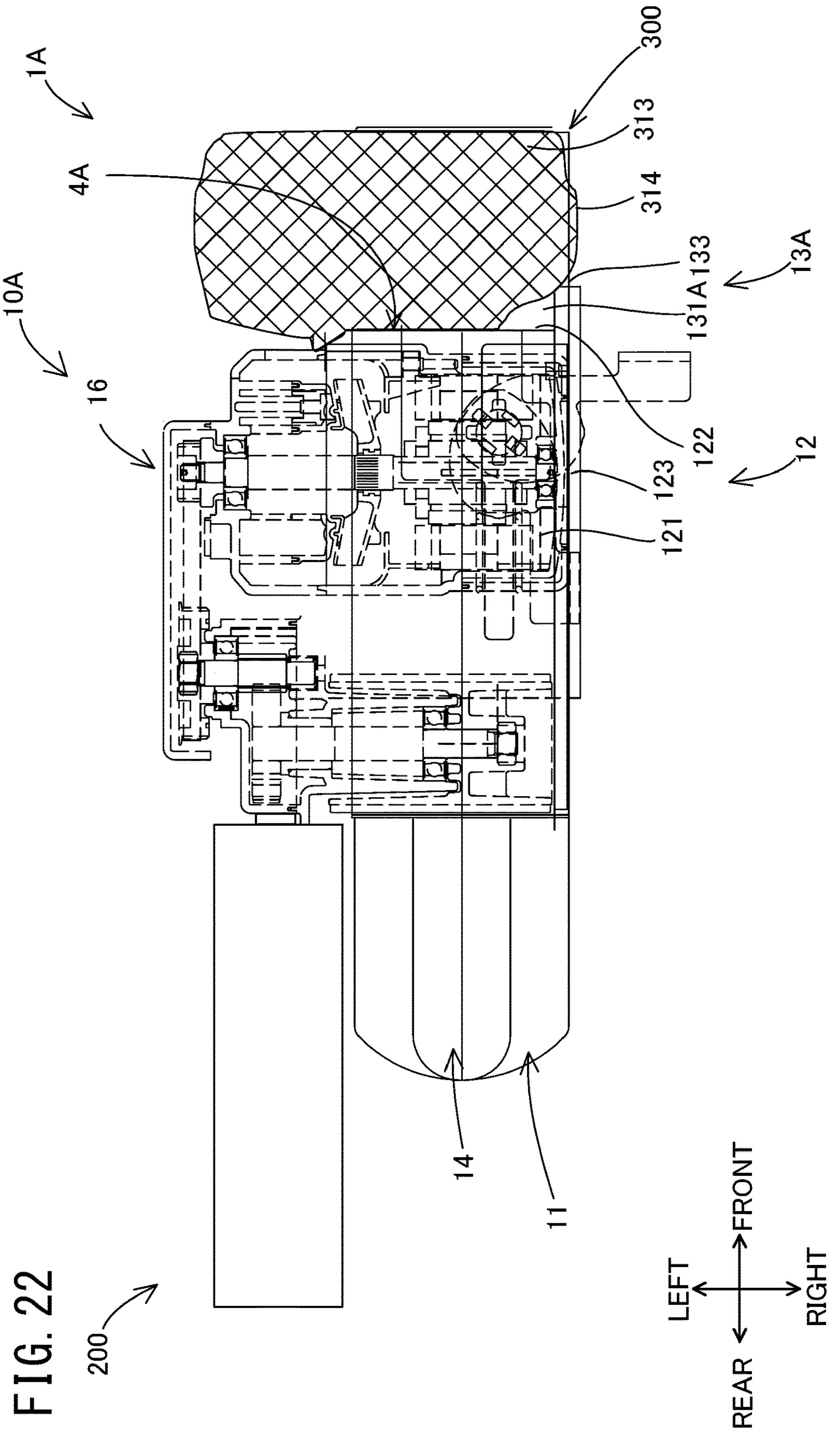
FIG. 22 is a top view of the belt sander of the second embodiment.

A belt sander 1A according to a second embodiment of the present disclosure is now described with reference to FIGS. 21 and 22. The following description mainly refers to the structure of a battery mounting part 4A, and components or elements of the belt sander 1A that are substantially identical to those of the belt sander 1 of the above-described first embodiment are not described. In the drawings, the battery 300 mounted to the battery mounting part 4A is shown cross-hatched in order to clarify the position of the battery mounting part 4A on the belt sander 1A. Further, in FIG. 21, elements disposed within the belt sander 1A are shown by solid lines, and in FIG. 22, they are shown by broken lines.

Like the battery mounting part 4 of the first embodiment, the battery mounting part 4A is provided in front of the motor 2 and above the belt driving part 6. This embodiment is different from the first embodiment in that the battery mounting part 4A is provided on a front wall 122 of a first part 12 of a housing 10A. A mounting face that faces the mounting face 321 of the battery 300, a pair of guide rails, a pair of power terminals and a signal terminal, which are described in the first embodiment, are provided on the front wall 122 of the first part 12. In this embodiment, the guide rails, the power terminals and the signal terminal extend in the left-right direction. In this embodiment, the direction of sliding the battery 300 relative to the battery mounting part 4A is the left-right direction. Specifically, the direction of mounting the battery 300 to the battery mounting part 4A is a direction from the left to the right, and the direction of removing the battery 300 from the battery mounting part 4A is a direction from the right to the left. In the battery mounted state, the surface 312 having the largest area on the battery 300 faces forward of the belt sander 1A and the side surfaces 313 of the battery 300 face upward and downward, respectively. One of the side surfaces 313 faces an upper wall 131A of a second part 13A.

Like in the first embodiment, the battery mounting part 4A is configured such that the battery 300 does not protrude upward from the upper wall 121 of the housing 10A in the up-down direction in the battery mounted state. Further, the battery mounting part 4A is configured such that the battery 300 does not protrude leftward from a left end of the housing 10A and rightward from a right end of the housing 10A in the left-right direction in the battery mounted state. Further, the battery mounting part 4A is configured such that the battery 300 does not protrude forward from a front end of the housing 10A in the front-rear direction in the battery mounted state.

The battery 300 has a rectangular box-like shape having a shorter width (length) in the up-down direction of the battery 300 (see FIG. 20) than the widths (lengths) in the front-rear direction and the left-right direction. Further, the one side surface 313 faces the upper wall 131A of the second part 13A. Therefore, the belt sander 1A of this embodiment can be configured such that the battery 300 does not protrude forward from the front end of the housing 10A in the front-rear direction while the length of the second part 13A in the front-rear direction is shorter than that of the second part 13 of the first embodiment. Thus, the belt sander 1A provides the advantage of being more compact in the front-rear direction than the belt sander 1 of the first embodiment.

Further, the weights of the motor 2 and the battery 300 mounted to the battery mounting part 4A are applied to the sanding surface B1 during driving of the belt sander 1A. Therefore, like the belt sander 1 of the first embodiment, the belt sander 1A of this embodiment is also improved in operational efficiency.

Third Embodiment

Figure 23:
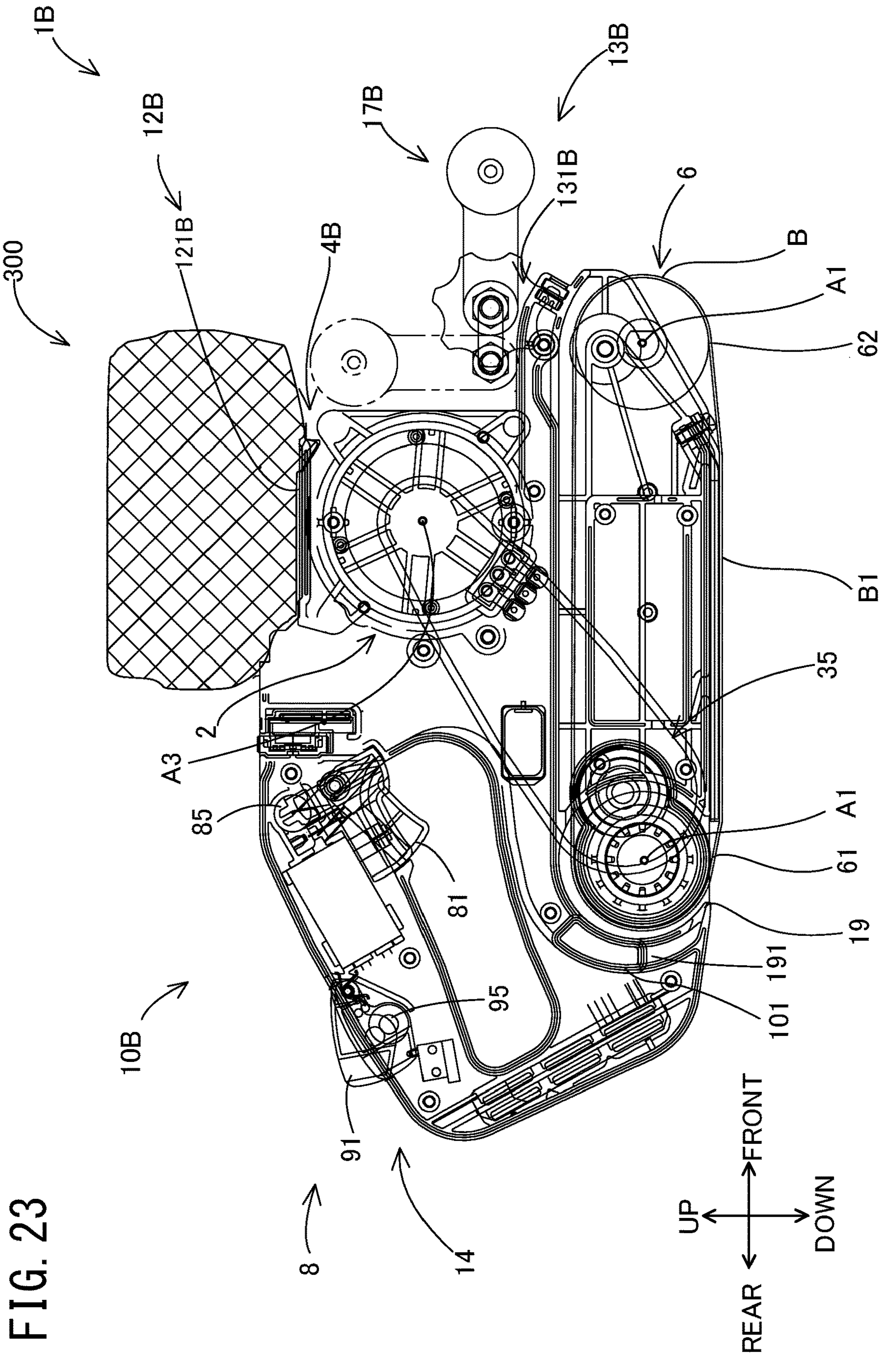
FIG. 23 is a right side view of a belt sander according to a third embodiment, with a right body housing removed.
Figure 24:
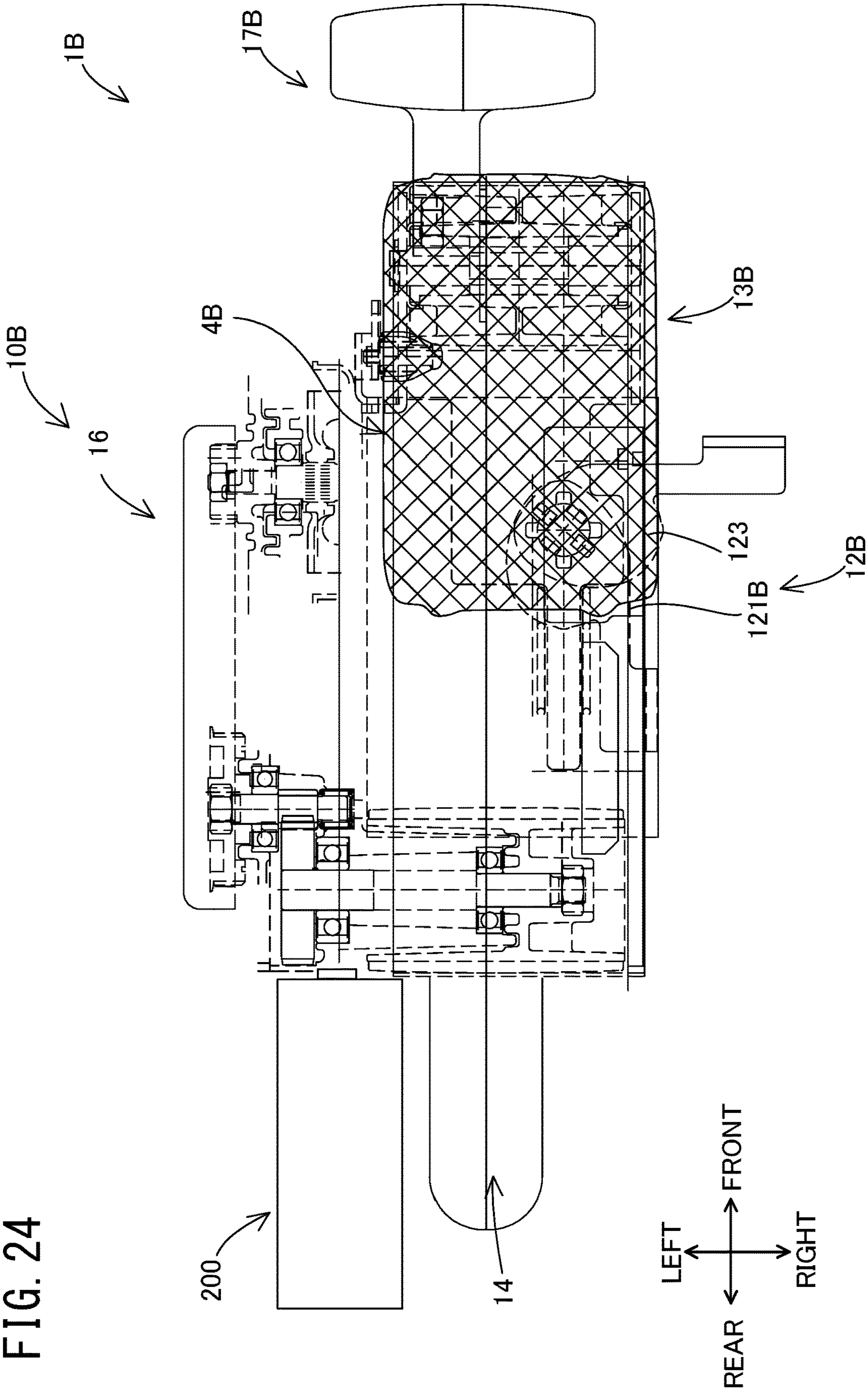
FIG. 24 is a top view of the belt sander of the third embodiment.

A belt sander 1B according to a third embodiment of the present disclosure is now described with reference to FIGS. 23 and 24. The belt sander 1B is different from the above-described embodiments in that a battery mounting part 4B is provided directly above the motor 2. In FIG. 23, elements disposed within the belt sander 1B are shown by solid lines, and in FIG. 24, they are shown by broken lines.

The battery mounting part 4B is provided on an upper wall 121B of a first part 12B (motor housing part) of a housing 10B. Specifically, in this embodiment, a mounting face that faces the mounting face 321 of the battery 300, a pair of guide rails, a pair of power terminals and a signal terminal are provided on the upper wall 121B of the first part 12B. Like in the first embodiment, the guide rails, the power terminals and the signal terminal extend in the front-rear direction, and the direction of sliding the battery 300 relative to the battery mounting part 4B is the front-rear direction. Specifically, the direction of mounting the battery 300 to the battery mounting part 4B is a direction from the front to the rear, and the direction of removing the battery 300 from the battery mounting part 4B is a direction from the rear to the front. In the battery mounted state, the surface 312 having the largest area on the battery 300 faces upward.

The battery mounting part 4B is configured such that the battery 300 does not protrude leftward from a left end of the housing 10B and rightward from a right end of the housing 10B in the left-right direction in the battery mounted state. Further, the battery mounting part 4B is configured such that the battery 300 does not protrude forward from a front end of the housing 10B in the front-rear direction in the battery mounted state. With the configuration in which the battery mounting part 4B is provided on the first part 12B, the second part 13B is formed shorter in the front-rear direction than that of the first embodiment. A front handle 17B having a pivot axis extending in the left-right direction is provided on an upper wall 131B of the second part 13B.

The belt sander 1B of this embodiment provides the advantage of being more compact in the front-rear direction than the belt sander 1 of the first embodiment. Further, like the belt sander 1 of the first embodiment, the direction of mounting the battery 300 to the battery mounting part 4B is a direction from the front to the rear along the extending direction of the handle 14. Therefore, the user can easily apply a force in a direction (from the rear to the front) opposite to the mounting direction of the battery 300 with the hand holding the handle 14. Thus, the belt sander 1B provides the advantage that the battery 300 can be easily mounted to the battery mounting part 4B.

Further, the weights of the motor 2 and the battery 300 mounted to the battery mounting part 4B are applied to the sanding surface B1 during driving of the belt sander 1B. Therefore, like the belt sander 1 of the first embodiment, the belt sander 1B of this embodiment is also improved in operational efficiency.

<Other Embodiments of the Battery Mounting Part>

Figure 25:
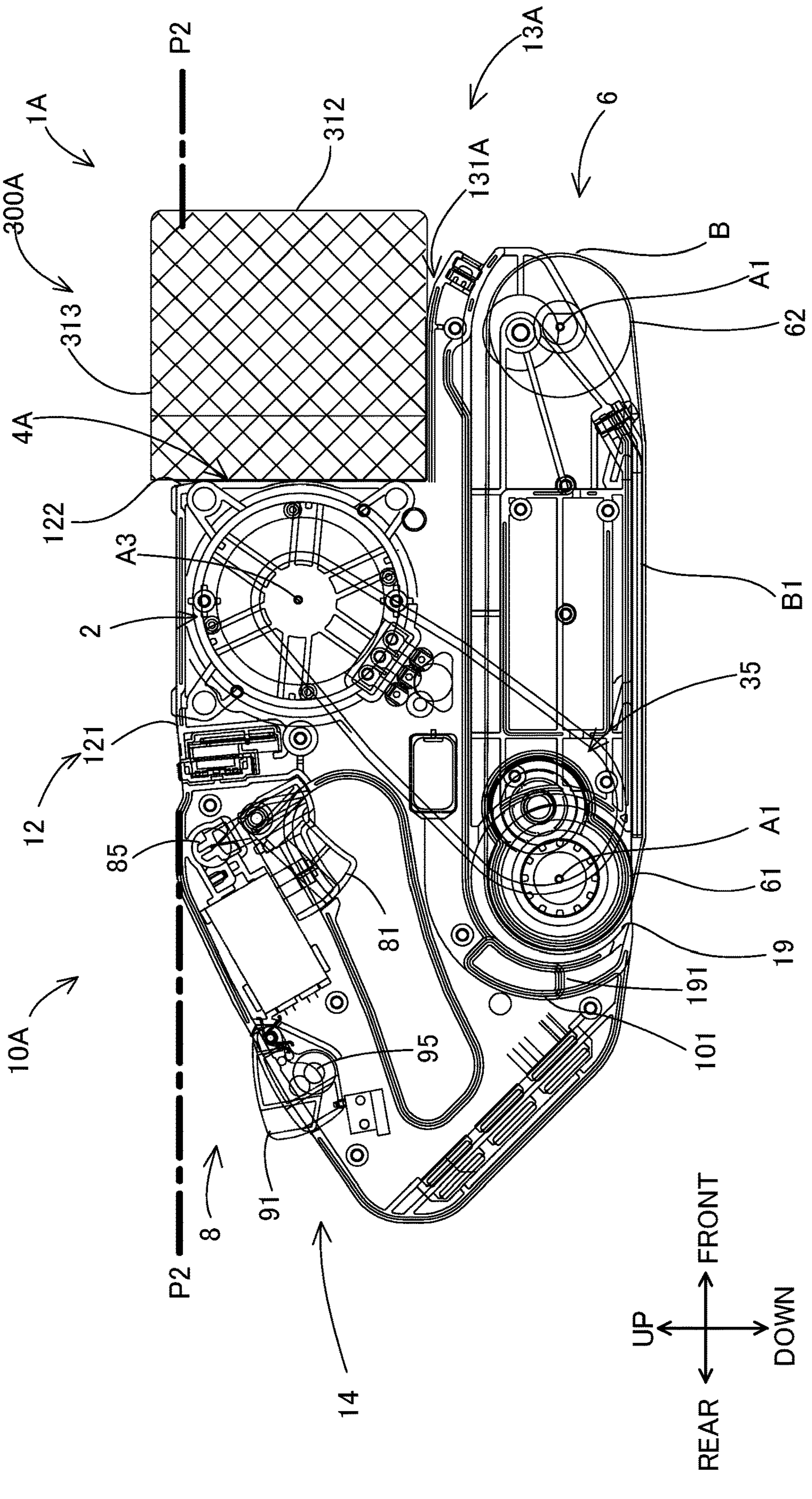
FIG. 25 is a right side view showing the belt sander of the second embodiment with a battery having a larger external size and a larger capacity being mounted thereto, with the right body housing removed.
Figure 26:
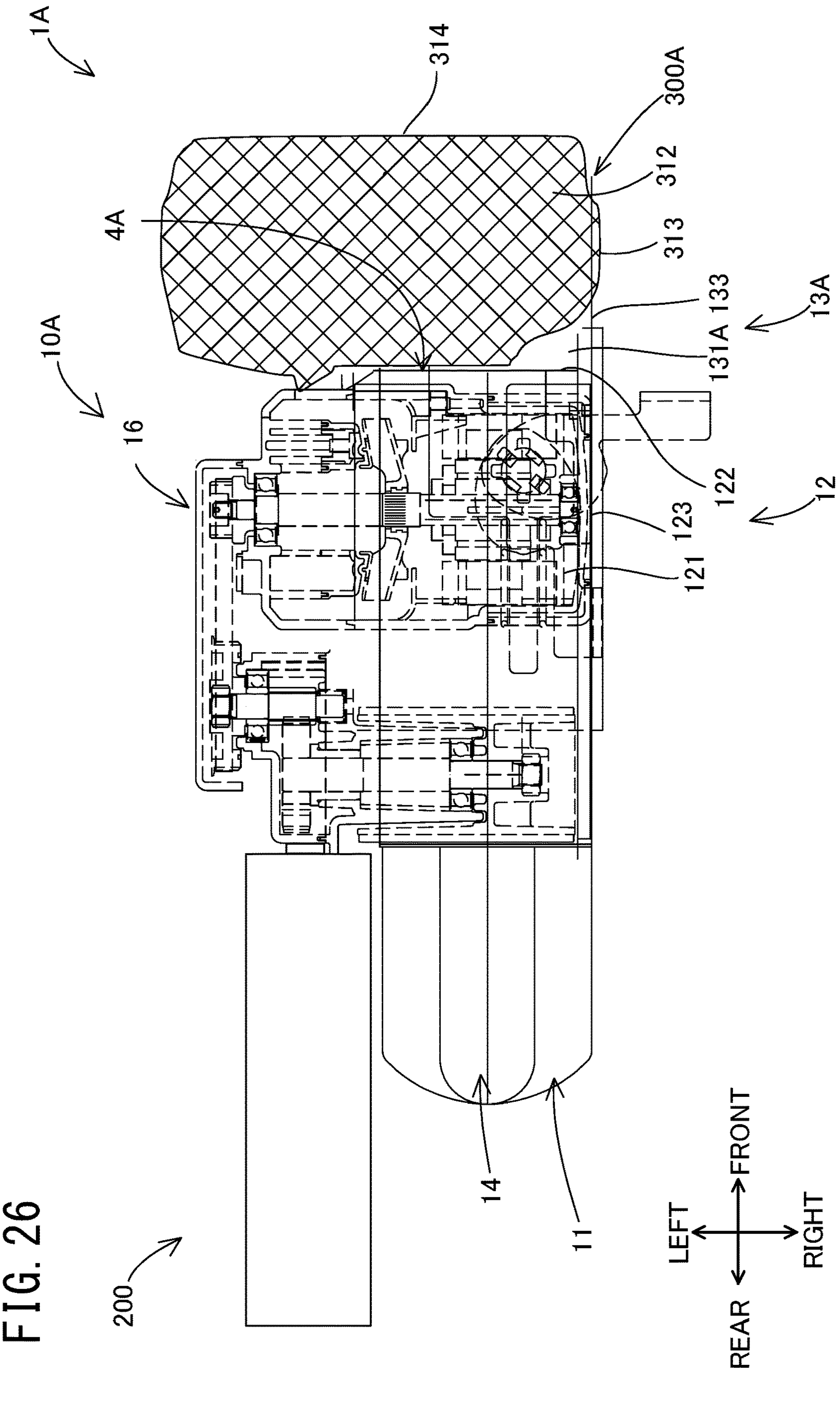
FIG. 26 is a top view showing the belt sander of the second embodiment with the battery having a larger external size and a larger capacity being mounted thereto.

The battery mounting part 4, 4A may be configured such that the battery 300 protrudes upward from the upper wall 121 by a prescribed protruding length in the battery mounted state. The battery mounting part 4, 4A, 4B may be configured such that the battery 300 protrudes forward from the front end of the belt sander 1, 1A, 1B by a prescribed protruding length in the battery mounted state. Likewise, the battery mounting part 4, 4A, 4B may be configured such that the battery 300 protrudes leftward or rightward from the left or right end of the belt sander 1, 1A, 1B by a prescribed protruding length in the battery mounted state. FIGS. 25 and 26 show the belt sander 1A of the second embodiment with a battery 300A having a larger external size and a larger capacity than the battery 300 of the above-described embodiments being mounted thereto. The prescribed protruding lengths in the up-down direction, the front-rear direction and the left-right direction are preferably 10% or less of the lengths of the battery 300A in the up-down direction, the front-rear direction and the left-right direction, respectively. According to this embodiment, the belt sander with the battery 300A mounted thereto can also be more compact in the up-down direction, the left-right direction and the front-rear direction, and can suppress interference of the battery 300A with working operation.

The direction of sliding the battery 300 relative to the battery mounting part 4, 4A is not limited to the front-rear direction or the left-right direction, but it may be a horizontal direction including the front-rear direction and the left-right direction. For example, the sliding direction may be an oblique direction orthogonal to the up-down direction and crossing the front-rear direction and the left-right direction. According to this embodiment, the weights of the motor 2 and the battery 300 mounted to the battery mounting part 4, 4A are also applied to the sanding surface B1 during driving of the belt sander 1, 1A. Thus, the working operation can be performed by utilizing the masses of the motor 2 and the battery 300, so that the operational efficiency of the belt sander 1, 1A is also improved.

Further, in view of the nature of the present disclosure and the above-described embodiments, the following aspects can be provided. At least one of the following aspects can be adopted in combination with at least one of the above-described embodiments, their modifications and the claimed invention.

(Aspect 1-1) A dust box, which is configured to be removably mounted to a belt sander, the belt sander having a belt driving part configured to rotate an endless sanding belt, and a housing that has a discharge nozzle and a suction nozzle and houses an electric motor for driving the belt driving part and a dust collecting fan, the dust box comprising:

a first nozzle configured to be connected to the discharge nozzle;

a second nozzle configured to be connected to the suction nozzle;

a container part formed of synthetic resin and connected to the first and second nozzles; and a filter that is configured to separate dust from air and arranged within the container part to partition an inside space of the container part into a first space that communicates with the first nozzle and a second space that communicates with the second nozzle.

(Aspect 1-2) The filter is arranged closer to the second nozzle than to the first nozzle within the container part.

(Aspect 1-3) The belt driving part includes a drive roller that is rotated by the motor, and a driven roller, and where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, a polishing surface is defined by a lower surface of the sanding belt, and the dust box is configured such that, when the dust box is mounted to the belt sander, the first nozzle is located below the second nozzle, and the first space is a lower space within the container part.

(Aspect 1-4) The first and second nozzles are open in the same direction.

(Aspect 1-5) The filter is a bag-like air filter having an open end.

(Aspect 1-6) The container part has a nozzle connection part that is connected to the first and second nozzles, and a body part that is removably fitted to the nozzle connection part, and the filter is provided on the nozzle connection part.

(Aspect 1-7) The dust box further has an attaching/detaching part configured to attach and detach the body part to and from the nozzle connection part.

(Aspect 1-8) At least part of the dust box is formed of conductive synthetic resin.

(Aspect 1-9) Where an up-down direction is defined with the side of the belt sander on which the belt driving part is arranged being defined as a lower side and the opposite side defined as an upper side, at least part of the container part that is located below a central position of the container part in the up-down direction when the dust box is mounted to the belt sander is formed of the conductive synthetic resin.

(Aspect 1-10) The dust box further has an earth member having one end part connected to the part formed of the conductive synthetic resin, and the other end part exposed outside the dust box.

(Aspect 1-11) A belt sander, having the dust box removably mounted thereto.

(Aspect 1-12) The belt sander, comprising:

an electric motor;

a dust collecting fan;

a housing that houses the motor and the dust collecting fan; and a belt driving part that includes a drive roller configured to be rotated by the motor, and a driven roller, and is configured to drive an endless sanding belt looped over the drive roller and the driven roller, wherein:

where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the housing, the housing includes:

a discharge nozzle configured to discharge dust generated by the working operation from the housing and a suction nozzle configured to suck air from the dust box into the housing;

a dust collection port provided behind the belt driving part;

an air outlet that communicates with a space where the dust collecting fan is housed;

a first passage that connects the dust collection port and the discharge nozzle, and a second passage that connects the suction nozzle and the air outlet, wherein:

the first passage is separated from spaces where the motor and the dust collecting fan are housed within the housing, and the second passage, and the second passage communicates with the space where the dust collecting fan is housed, and the dust collecting fan is configured to rotate to generate an air flow from the dust collection port toward the discharge nozzle through the first passage, and an air flow from the suction nozzle toward the air outlet through the second passage.

(Aspect 1-13) The suction nozzle and the discharge nozzle are open to the rear, and the discharge nozzle is arranged below the suction nozzle.

(Aspect 2-1) A belt sander, comprising:

an electric motor;

a housing that houses the motor;

a belt driving part that includes a drive roller configured to be rotated by the motor, and a driven roller, and is configured to drive an endless sanding belt looped over the drive roller and the driven roller, wherein:

where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt;

a first switch that is arranged in the housing and has a first switch operation part, the first switch operation part being configured to be manually operated by a user to be moved to a first ON position to place the first switch in an ON state and a first OFF position to place the first switch in an OFF state; and a second switch that is arranged in the housing and has a second switch operation part, the second switch operation part being configured to be manually operated by a user to be moved to a second ON position to place the second switch in an ON state and a second OFF position to place the second switch in an OFF state;

wherein:

the first and second switches are each a momentary switch, the motor is configured to be driven when the first and second switches are in the ON state, and to be stopped when at least one of the first and second switches is in the OFF state, the belt sander further comprising:

a first lock switch that is arranged in the housing and configured to keep the first switch operation part in the first ON position; and a second lock switch that is arranged in the housing and configured to keep the second switch operation part in the second ON position.

(Aspect 2-2) The housing includes a motor housing part for housing the motor, and a grip part that is connected to the motor housing part and extends rearward from the motor housing part, the second switch operation part is provided in the grip part and shaped to protrude upward from the grip part in the second OFF position, and the second switch operation part is configured to be moved from the second OFF position to the second ON position when pushed relative to the grip part.

(Aspect 2-3) The second lock switch is provided in the housing so as to be movable in a direction crossing a moving direction of the second switch operation part.

(Aspect 2-4) The first and second lock switches are provided on the same side of the housing.

(Aspect 2-5) The second lock switch is provided below the first lock switch.

(Aspect 2-6) The first lock switch is configured to be moved to:

a lock-off position to be engaged with the first switch operation part placed in the first OFF position to restrict movement of the first switch operation part to the first ON position, and a lock-on position to be engaged with the first switch operation part placed in the first ON position to restrict movement of the first switch operation part to the first OFF position.

(Aspect 2-7) The first switch has a first biasing member that biases the first switch operation part placed in the first ON position to be returned to the first OFF position, and the second switch has a second biasing member that biases the second switch operation part placed in the second ON position to be returned to the second OFF position.

(Aspect 2-8) The grip part extends rearward and downward from the motor housing part, the first switch operation part is provided in the grip part between the second switch and the motor housing part and shaped to protrude downward from the grip part in the first OFF position, and the first switch operation part is configured to be moved from the first OFF position to the first ON position when depressed relative to the grip part.

(Aspect 2-9) An upper wall of the motor housing part is substantially parallel to the polishing surface, and the second switch operation part is provided below an imaginary plane including the upper wall.

DESCRIPTION OF THE REFERENCE NUMERALS

1, 1A, 1B: belt sander, 10, 10A, 10B: housing, 11: body housing, 11L: left body housing, 11R: right body housing, 12, 12B: first part, 121: upper wall, 122: front wall, 123: side wall, 124: rear wall, 13, 13A, 13B: second part, 131, 131A: upper wall, 133: side wall, 14: handle, 14L: left wall, 14R: right wall, 142: support wall, 144: opening, 145L: opening, 145R: opening, 146: recess, 146*a*: first flange, 146*b*: second flange, 147: opening, 149: opening, 149L: projection, 149R: projection, 15: controller housing part, 16: side housing, 161: fan housing, 162: gear cover, 163: belt cover, 165: air outlet, 140: discharge nozzle, 150: suction nozzle, 17, 17B: front handle, 171: arm, 172: proximal end part, 173: distal end part, 175: grip part, A4: pivot axis, 18: turning part, 19: dust collection port, 2: motor, 21: motor body, 22: shaft, A3: rotational axis, 3: fan, 31: guide plate, 32: baffle plate, 4, 4A, 4B: battery mounting part, 41: mounting face, 42: guide rail, 44: power terminal, 46: signal terminal, 47: lock receiving hole, 5: controller, 6: belt driving part, 61: drive roller, 62: driven roller, A1, A2: rotational axis, 64: support frame, 8: switching mechanism, 80: first switch, 81: first switch operation part, 811: base, 812: abutment part, 814: boss, 815: projection, 818: biasing member, 82: first main switch, 821: body, 822: plunger, 85: first lock switch, 851: operation stem, 851L, 851R: operation part, 853: lock-off locking part, 854: recess, 854L, 854R: restriction wall, 855L, 855R: lock-on locking part, 858: biasing member, 859: holding part, 91: second switch operation part, 911: base, 911L: left wall, 912: abutment part, 915: shaft hole, 916: rotary shaft, 917: opening, 918: torsion spring, 918*f*: arm, 92: second main witch, 921: body, 922: actuator, 95: second lock switch, 951: operation part, 952: flange part, 953: stepped pin, 954: locking part, 958: biasing member, 35: power transmitting part, 39: dial, 101: partition, 102: wall part, 191: first passage, 192: second passage, 200: dust box, 210: first nozzle, 212: O-ring, 220: second nozzle, 222: O-ring, 230: container part, 231: upper surface, 232: rear wall, 233: side surface, 234: lower surface, 235: window part, 240: nozzle connection part, 240L: left nozzle part, 240R: right nozzle part, 241: partition, 242: groove, 243: rear end part, 244: O-ring, 245: engagement part, 246: nut, 247: plate, 250: body part, 253: front end part, 258: tubular part, 260: filter, 261: opening, 262: frame, 265: earth member, 270: attaching/detaching part, 271: mounting screw, 272: knob, 273: shaft, 274: front end part, 281: first space, 282: second space, 300, 300A: battery, 305: locking member, 310: case, 311: protruding part, 312: upper surface, 313: side surface, 314: front surface, 320: mounting part, 321: mounting face, 322: rail receiving part, 324: power terminal, 326: signal terminal, B: sanding belt, B1: sanding surface, F1, F2: air flow, P1, P2: imaginary plane, R1, R2, R3, R4: turning position

The invention claimed is:

1. A belt sander, comprising:

an electric motor;

a housing that includes a motor housing for housing the motor;

a belt driving part that includes a drive roller configured to be rotated by the motor, and a driven roller, and is configured to drive an endless sanding belt looped over the drive roller and the driven roller, wherein:

where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt;

a first handle that is provided on one side or rear side of the motor in the front-rear direction to extend in the front-rear direction and configured to be held by a user; and a battery mounting part configured such that a battery as a power source of the motor can be mounted thereto and removed therefrom by being slid in a sliding direction, wherein:

the battery mounting part is arranged in a position to overlap with the polishing surface when viewed from above and to overlap with the motor when viewed from the front, the sliding direction is a horizontal direction including the front-rear direction and the left-right direction, the motor housing part has an upper wall substantially parallel to the polishing surface, the battery mounting part is provided below the upper wall in the up-down direction, and the battery mounting part is configured such that the battery mounted to the battery mounting part does not protrude upward from the upper wall in the up-down direction.

2. The belt sander as defined in claim 1, wherein: the battery mounting part is configured such that the battery mounted to the battery mounting part does not protrude from a front end of the housing in the front-rear direction.

3. The belt sander as defined in claim 1, wherein: the battery mounting part is configured such that the battery mounted to the battery mounting part protrudes forward from a front end of the housing by a prescribed protruding length in the front-rear direction, and the protruding length is 10% or less of a length of the battery in the front-rear direction.

4. The belt sander as defined in claim 1, wherein: the battery mounting part is configured such that the battery mounted to the battery mounting part does not protrude from left and right ends of the housing in the left-right direction.

5. The belt sander as defined in claim 1, wherein: the battery mounting part is configured such that the battery mounted to the battery mounting part protrudes leftward or rightward from the left or right end of the housing by a prescribed protruding length in the left-right direction, and the protruding length is 10% or less of a length of the battery in the left-right direction.

6. The belt sander as defined in claim 1, wherein: the sliding direction is the front-rear direction, and the battery mounting part is configured such that the battery can be mounted to the battery mounting part by being slid in a direction from the front to the rear relative to the battery mounting part.

7. The belt sander as defined in claim 1, wherein: the battery mounting part is configured such that the battery can be mounted thereto and removed therefrom by being slid in the left-right direction.

8. The belt sander as defined in claim 1, further comprising: a second handle having an arm having a pivot axis extending in the left-right direction and connected to the housing, and a grip part connected to the arm and configured to be held by a user, the second handle being turnable relative to the housing, wherein: according to turning (turning operation) of the second handle, the grip part moves to: a first turning position in which an upper end of the grip part is located substantially in the same position as an upper wall of the motor housing part in the up-down direction, and a second turning position in which the grip part is located below or above the battery mounted to the battery mounting part, in the up-down direction.

9. The belt sander as defined in claim 1, to which the battery is removably mounted.

10. A belt sander, comprising: an electric motor; a housing that includes a motor housing part for housing the motor; a belt driving part that includes a drive roller configured to be rotated by the motor, and a driven roller, and is configured to drive an endless sanding belt looped over the drive roller and the driven roller, wherein: where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt; a first handle that is provided on one side or rear side of the motor in the front-rear direction to extend in the front-rear direction and configured to be held by a user; a second handle that has an arm having a pivot axis extending in the left-right direction and connected to the housing, and a grip part connected to the arm and configured to be held by a user, the second handle being turnable relative to the housing; and a battery mounting part configured such that a battery as a power source of the motor can be mounted thereto and removed therefrom by being slid in a sliding direction, wherein: the battery mounting part is arranged in a position to overlap with the polishing surface when viewed from above and to overlap with the motor when viewed from the front, the battery mounting part is configured such that the battery mounted to the battery mounting part does not protrude from an upper wall of the motor housing part in the up-down direction, according to turning of the second handle, the grip part moves to: a first turning position in which an upper end of the grip part is located substantially in the same position as the upper wall in the up-down direction, and a second turning position in which the grip part is located below or above the battery mounted to the battery mounting part, in the up-down direction.

11. The belt sander as defined in claim 10, to which the battery is removably mounted.

12. The belt sander as defined in claim 10, wherein: the battery mounting part is configured such that an upper surface of the battery mounted to the battery mounting part is located substantially in the same position as the upper wall in the up-down direction.

13. A belt sander, comprising: an electric motor; a housing that includes a motor housing for housing the motor; a belt driving part that includes a drive roller configured to be rotated by the motor, and a driven roller, and is configured to drive an endless sanding belt looped over the drive roller and the driven roller, wherein: where a direction in which a rotational axis of the drive roller and a rotational axis of the driven roller extend is defined as a left-right direction, a direction in which the drive roller and the driven roller are arranged in parallel is defined as a front-rear direction, and a direction orthogonal to the left-right direction and the front-rear direction is defined as an up-down direction, the belt driving part is arranged below the motor, and a polishing surface is defined by a lower surface of the sanding belt; a first handle that is provided on one side or rear side of the motor in the front-rear direction to extend in the front-rear direction and configured to be held by a user; a battery mounting part configured such that a battery as a power source of the motor can be mounted thereto and removed therefrom by being slid in a sliding direction, wherein: the battery mounting part is arranged in a position to overlap with the polishing surface when viewed from above and to overlap with the motor when viewed from the front, and the sliding direction is a horizontal direction including the front-rear direction and the left-right direction; and a second handle having an arm having a pivot axis extending in the left-right direction and connected to the housing, and a grip part connected to the arm and configured to be held by a user, the second handle being turnable relative to the housing, wherein: according to turning (turning operation) of the second handle, the grip part moves to: a first turning position in which an upper end of the grip part is located substantially in the same position as an upper wall of the motor housing part in the up-down direction, and a second turning position in which the grip part is located below or above the battery mounted to the battery mounting part, in the up-down direction.

14. The belt sander as defined in claim 13, to which the battery is removably mounted.

* * * * *